(12) United States Patent
Suzuki et al.

(10) Patent No.: US 6,466,915 B1
(45) Date of Patent: *Oct. 15, 2002

(54) CUSTOMER HISTORY MANAGEMENT METHOD AND SYSTEM IN ONLINE SHOPPING

(75) Inventors: Tetsujiro Suzuki, Kawasaki (JP); Yuriko Kashu, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/679,098

(22) Filed: Jul. 12, 1996

(30) Foreign Application Priority Data

Dec. 8, 1995 (JP) .............................................. 7-320909

(51) Int. Cl.⁷ .......................... G06F 17/60; G06F 17/00
(52) U.S. Cl. .......................................... 705/14; 705/26
(58) Field of Search ...................... 705/26, 14; 395/600, 395/800

(56) References Cited

U.S. PATENT DOCUMENTS

| | | | |
|---|---|---|---|
| 4,654,482 A | * 3/1987 | DeAngelis | 379/97.12 |
| 5,482,139 A | * 1/1996 | Rivalto | 186/36 |
| 5,515,270 A | * 5/1996 | Weinblatt | 705/14 |
| 5,535,407 A | * 7/1996 | Yanagawa et al. | 395/800 |
| 5,551,021 A | * 8/1996 | Harada et al. | 395/600 |
| 5,592,378 A | * 1/1997 | Cameron et al. | 705/27 |
| 5,664,110 A | * 9/1997 | Green et al. | 705/26 |
| 5,710,884 A | * 1/1998 | Dedrick | 395/200.47 |
| 5,715,314 A | * 2/1998 | Payne et al. | 380/24 |
| 5,721,827 A | * 2/1998 | Logan et al. | 395/200.47 |
| 5,724,521 A | * 3/1998 | Dedrick | 395/226 |
| 5,774,868 A | * 6/1998 | Cragun et al. | 705/10 |

FOREIGN PATENT DOCUMENTS

WO  WO 97/50064  * 12/1997  ............. G07F/7/00

OTHER PUBLICATIONS

Toland, Patrick, "C/Net: The Computer Network Unveils Revolutionary Internet Advertising Tools That Allow Custom Banner Ad Delivery Based on Demographic Information", Dec. 6, 1995, PR Newswire, 3 pages.*

* cited by examiner

Primary Examiner—Eric W. Stamber
Assistant Examiner—James W. Myhre
(74) Attorney, Agent, or Firm—Staas & Halsey LLP

(57) ABSTRACT

In online shopping, customer information when a customer selects and buys a desired article from goods information provided to a customer terminal from a center which provides online shopping information including the goods information to the customer terminal is managed. When the customer performs the online shopping, the goods information is stored for each customer individually, which goods information is goods information selected by the customer from goods information provided by the center. Then, the stored goods information is read out the next time a goods information search request is made by the customer, and the read goods information is displayed for the customer.

27 Claims, 25 Drawing Sheets

---

THE FOLLOWING ARE GOODS YOU SELECTED WHEN COMING TO THE STORE ON OCTOBER 10 :

| ARTICLE NUMBER | ARTICLE NAME | COLOR | SIZE | ORDERED NUMBER | TOTAL PRICE |
|---|---|---|---|---|---|
| 4444 - 01 | WRAP SKIRT | PINK | M | 1 | 12.000 |
| 5555 - 13 | TIGHT SKIRT | BLUE | M | 1 | 18.000 |
| 3555 - 01 | ONE-PIECE DRESS | BLACK | M | 1 | 20.000 |

FIG.8

THE FOLLOWINGS ARE GOODS YOU SELECTED,
PLEASE SELECT GOODS YOU WISH TO BUY,

| ARTICLE NUMBER | ARTICLE NAME | COLOR | SIZE | ORDERED NUMBER | TOTAL PRICE |
|---|---|---|---|---|---|
| 4444-01 | WRAP SKIRT | PINK | M | 1 | 12.000 |
| 5555-13 | TIGHT SKIRT | BLUE | M | 1 | 18.000 |
| 1522-01 | JACKET | BLUE | M | 1 | 20.000 |
| 1529-06 | JACKET | WHITE | M | 1 | 25.000 |
| 3555-01 | ONE-PIECE DRESS | BLACK | M | 1 | 20.000 |

FIG. 10

THE FOLLOWING ARE GOODS YOU SELECTED WHEN COMING TO
THE STORE ON OCTOBER 10. :

| ARTICLE NUMBER | ARTICLE NAME | COLOR | SIZE | ORDERED NUMBER | TOTAL PRICE |
|---|---|---|---|---|---|
| 4444 - 01 | WRAP SKIRT | PINK | M | 1 | 12.000 |
| 5555 - 13 | TIGHT SKIRT | BLUE | M | 1 | 18.000 |
| 3555 - 01 | ONE-PIECE DRESS | BLACK | M | 1 | 20.000 |

FIG. 18

| | | | |
|---|---|---|---|
| YOUR NAME | ATSUKO YAMAMOTO | | SEX |
| | | | MALE |
| DATE OF BIRTH | 1970 YEAR  10 MONTH  14 DAY | | FEMALE |
| | | SEX ▷ | RETURN |
| ADDRESS | | | |
| TELEPHONE NUMBER | | | |
| CUSTOMER ID | 1 1 2 2 3 4 5 1 | REGISTER | CANCEL |

FIG. 24

| CUSTOMER ID | NAME | STATUS | ADDRESS | TELEPHONE NUMBER | MOST FREQUENTLY USED STORE | BUYING TYPE | SIZE |
|---|---|---|---|---|---|---|---|
| ABC123 | TARO OKAMOTO | 1 | ...,NAKANO -WARD, TOKYO | 03-xxxx-xxxx | 3 | 8 | M |
| DEF456 | HANAKO AZUMA | 1 | ...,SHINAGAWA -WARD, TOKYO | 03-xxxx-xxxx | 1 | 2 | M |

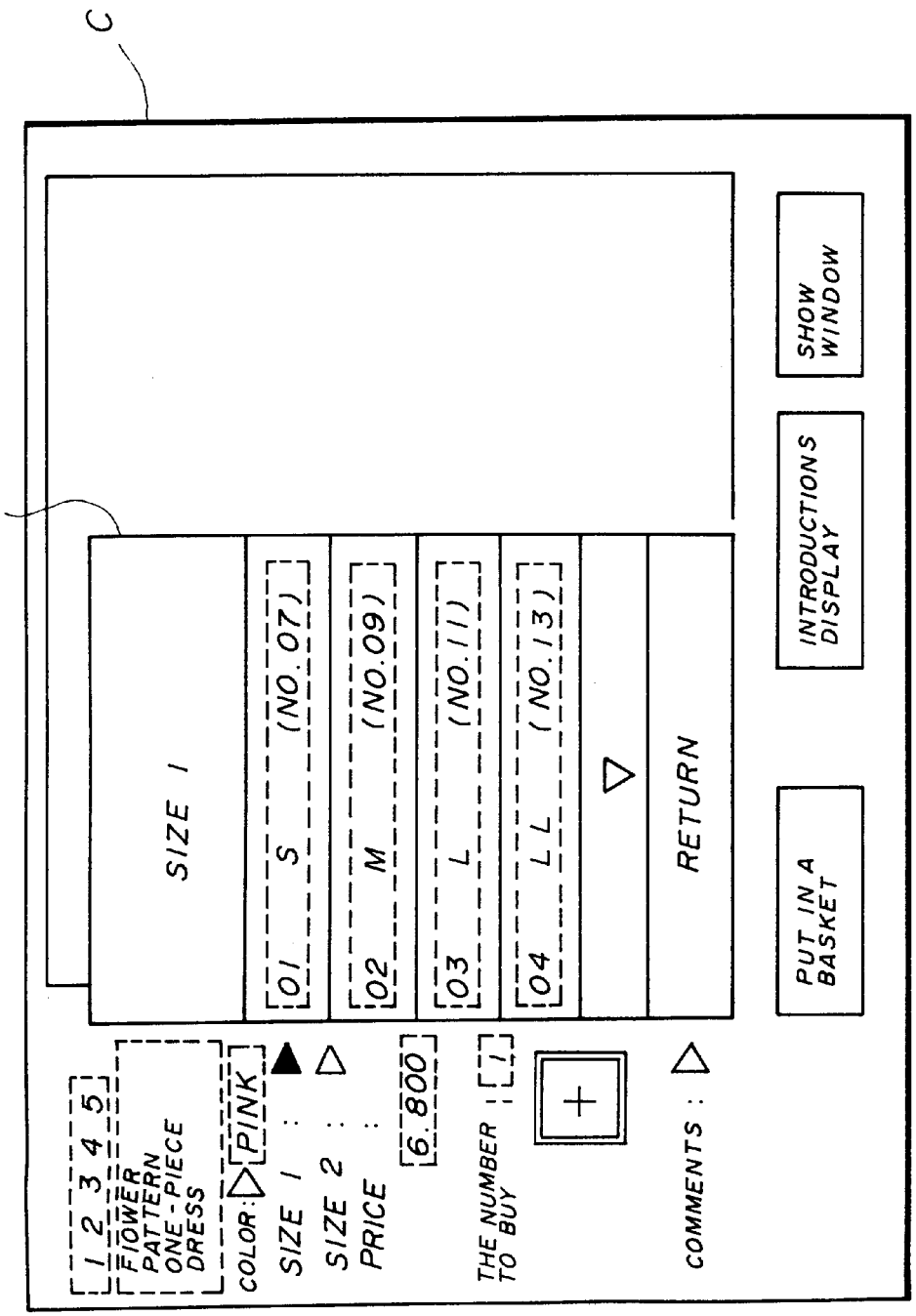

CUSTOMER HISTORY MANAGEMENT METHOD AND SYSTEM IN ONLINE SHOPPING

BACKGROUND OF THE INVENTION

1. Field of the Invention

The present invention relates to a customer history management method and system in online shopping, and, in particular, to a customer history management method and system in online shopping, in which online shopping, in mail-order business using an online system, information of goods is transmitted to a customer from a center, the information of goods is displayed at the customer side and the customer may select a desired one of the goods.

In the online shopping, a system is demanded by which system, for each customer, information as to which goods were bought by the customer, information as to which goods the customer is curious about, and so forth are managed, and also, through which system, the customer may easily search for goods which the customer wishes to buy or is curious about.

2. Description of the Related Art

In online shopping in the related art, once a customer (user) is registered in a mail-order selling system which is provided by a center through a communications network, the center transmits various goods information to the customer. The transmitted goods information is displayed on a CRT at the customer side. Then, according to predetermined instructions shown on the CRT screen for making an order for a desired article, the customer makes an order for a desired article by inputting an article code, a number of the articles to be ordered, a cost thereof and so forth.

The center may manage goods information, which is transmitted from stores, for each store. The center transmits to the customer the individual goods information which were produced for the particular stores. Before starting the online shopping, the customer transmits to the center a name of a store from which the customer wishes to buy an article. Then, the center searches for and thus retrieves the information concerning that store and transmits this information to the customer. The customer refers to the transmitted goods information which was edited in the individual way of that store. The customer then makes an order for the article in a method similar to the above-mentioned method. In the goods information, the displayed contents and sequence thereof are fixed. Specifically, at first, the store is introduced, and then goods are introduced for each section.

However, in the above-described example in the related art, it is not possible to mark information of an article shown in goods information transmitted from the center in a catalog form, which article the customer is curious about but has not made a decision to order yet. In a case where goods are introduced on paper sheets as in an actual catalog book, it is possible to mark information of an article about which the customer is curious by folding the paper sheet, or adhering a tag to the paper sheet. Thereby, it is easy to search the catalog book for the information of the article shown on the paper sheet afterwards. However, in the case of online shopping, the information of the article is displayed on the CRT, and, therefore, it is not possible to again refer to the information of the article after the online system has been terminated. As a result, selection of an article is equivalent to ordering of the article in the online shopping in the related art. Therefore, a customer who is curious about an article but has not made a decision to order the article may actually order the article. If so, the customer will have to cancel the order when the customer changes his or her mind.

Further, in a case where the customer performs the online shopping using the goods information which was produced for each store as described above, when a store is specified, an introduction to the store is displayed first. Because the display sequence is fixed as mentioned above, even in a case where the customer previously specified the same store and thus was already shown the same store introduction display, the customer has to be shown the same store introduction display each time the store is specified. Further, in this online shopping system in the related art, information indicating the customers previously accessed information is not managed. Therefore, in a case where a customer accesses information in the morning and then the same customer accesses the same information in the afternoon, screens of image information displayed in the afternoon are the same as that displayed in the morning. As a result, for example, even when the customer access the information in the afternoon, a fixed message 'Good morning, may I help you?' is displayed in response thereto.

Further, until the information which the customer previously referred to and wishes to refer to again is reached, the customer will again be shown screens of image information the same as that which the customer was already shown when previously having referred to the information. Such a situation is inefficient and uneconomical in online information transmission.

SUMMARY OF THE INVENTION

The present invention has been made in consideration of the above-mentioned problem, and an object of the present invention is to provide a customer history management method and system in online shopping, in which method and system a mark is automatically given to information of an article about which a customer is curious:, screens of image information which were previously viewed by the customer are skipped over and thereby the customer can easily retrieve the information of that article.

Another object of the present invention is to provide a customer history management method and system in online shopping, in which method and system, in goods information which was produced for a particular store, if screens of image information such as a store introduction which were already shown to a customer accompany the goods information, unless the customer inputs special instructions for the accompanying screens of image information to be displayed, only the goods information can be automatically provided.

A first aspect of the present invention, in online shopping, manages customer information when a customer selects and buys a desired article from goods information provided to a customer terminal from a center which provides online shopping information including the goods information to the customer terminal, and comprises steps of:

a) storing goods information in storage means for each customer individually, which goods information is goods information selected by the customer from goods information provided by the center; and b) reading goods information from the storage means the next time a goods information search request is made by said customer, the read goods information being immediately displayed on a screen of the customer terminal.

According to a second aspect of the present invention, when goods information which has been provided by the center is displayed, the customer selects desired articles from the goods information. After the article selection is finished, a list of articles which were selected is displayed. The customer selects from the list of articles, articles to be actually bought. Then, information of articles which were bought and information of articles which were selected but were not bought are stored, separately.

According to a third aspect of the present invention, either a list of. selected articles or a list of bought articles is stored for each customer individually. A customer tendency is derived from either the list of articles selected or the list of articles bought, and the tendency is stored for each customer individually.

According to a fourth aspect of the present invention, an identifier of the customer is input, and a list of articles, which articles are articles that the customer of the identifier marked previously, is displayed. Articles that the customer actually decides to buy from the list of articles is determined. Then, the articles that the customer decided to buy are marked and stored for the customer individually.

According to a fifth aspect of the present invention, for each store which sells goods, either history information of article selection or article buying, or history information of access of the store is stored for each customer individually.

According to a sixth aspect of the present invention, as history information of the customer, a time the customer comes to the store and a time the customer leaves the store are stored. Then, with reference to the stored times, information being provided for the customer on a screen is appropriately changed.

According to a seventh aspect of the present invention, a total cost of articles which the customer selects or buys in the store, or goods information about articles that the customer selects or buys in the store is stored. Then, with reference to the stored information, information being provided for the customer on a screen is appropriately changed.

According to an eighth aspect of the present invention, a tendency of the customer is derived from the history information. Then, screen image goods information being provided to the customer is selected depending on the tendency.

According to a ninth aspect of the present invention, store member registration screen image information is provided for the customer only when the customer has not become a member of the store.

According to a tenth aspect of the present invention, in online shopping, customer information when a customer selects and buys desired article from goods information provided to a customer terminal by a center which provides online shopping information including the goods information to the customer terminal is managed. As history information, goods information which was selected by the customer from goods information provided by a store is stored. Then, the history information is referred to the next time the customer requests a provision of goods information, and goods information, which was stored as the history information, is provided for the customer.

According to an eleventh aspect of the present invention, in online shopping, a history when a customer accesses the center is managed. A center provides shopping information through an online system, and a terminal is used for inputting selection of desired articles from the shopping information provided by the center. The center comprises:

article selection information storage means for storing article selection information about articles that the customer selects;

article buying information storage means for storing article buying information about articles that the customer buys;

marked information storage means for storing information after marking the information, the information being a difference between all the article selection information stored in the article selection information storage means and the article buying information stored in the article buying information storage means;

marked information providing means for, when provision of the shopping information is requested through the terminal, reading marked information from the marked information storage means, and providing the marked information through the terminal.

According to a twelfth aspect of the present invention, in online shopping, a history when a customer accesses the center is managed. A center provides shopping information through an online system, and a terminal is used for inputting selection of desired articles from the shopping information provided by the center. The center comprises:

article selection information storage means for storing article selection information about articles that the customer selects;

article selection information providing means for providing the article selection information through the terminal;

bought-article-removed information storage means for storing article selection information which remains after removing article selection information of articles which the customer has bought, from article selection information provided by the article selection information providing means;

marked information storage means for storing information, the information being obtained as a result of marking information stored in the bought-article-removed information storage means;

marked information providing means for, when provision of the shopping information is requested through the terminal, reading marked information from the marked information storage means, and providing the marked information through the terminal.

According to a thirteenth aspect of the present invention, in online shopping, a history when a customer accesses the center is managed. A center provides shopping information through an online system, and a terminal is used for inputting selection of desired articles from the shopping information provided by the center. The center comprises:

history information storage means for storing at least one history information of history information of a store that the customer accesses in online shopping, article selection history information and article buying history information; and screen image information selection means for selecting screen image information being provided through the terminal depending on the history information stored in the history information storage means.

According to a fourteenth aspect of the present invention, the history information storage means comprises tendency information storage means for storing information indicating a tendency of the article selection history information or the article buying history information.

According to a fifteenth aspect of the present invention, the center further comprises registration screen image information providing means for providing member registration screen image information for the customer only when the customer has not been registered in the store in the online shopping.

According to a sixteenth aspect of the present invention, in online shopping, managing customer information about when a customer selects and buys a desired article from goods information provided to a customer terminal from a center which provides online shopping information including the goods information to the customer terminal is managed. As history information, goods information which was selected by the customer from goods information provided by a store is stored. Then, the history information is referred to the next time the customer requests provision of goods information, and goods information, which was stored as the history information, is provided to the customer.

In the above-described first, eleventh and sixteenth aspects of the present invention, the goods information of articles that the customer selected from goods information provided by the center is stored as history information. Then, the goods information stored as the history information is extracted and is immediately displayed at the next access case of the customer. Thereby, it is possible to omit display of many screen images until that goods information is reached. Thus, it is possible to easily display articles about which the customer is curious.

In the second and twelfth aspects of the present invention, articles that the customer selected from the goods information provided by the center but did not make orders for are listed after the completion of the article selection. Thereby, the customer can make orders after considering his or her budget and necessity of buying. When the customer makes a final decision of buying of some articles, then the customer inputs this information. Further, the goods information of the articles that the customer selected but did not buy and the goods information of the articles that the customer bought are separately stored. The articles that the customer merely selected are articles about which the customer was curious. Therefore, there is a possibility that the customer will buy the articles when accessing the center the next time if the budget condition is fulfilled. Therefore, it is effective to display the goods information of the articles that the customer merely selected at the next access.

In the fourth and thirteenth aspect of the present invention, by marking the goods information of the articles that the customer selected, it is easy to extract the goods information which is then displayed for the customer at the next access. Thus, it is possible to reduce the time required to search for the goods information.

In the third aspect of the present invention, the customer's tendencies (or tastes, for example, of size, color, article kinds) are derived from the articles that the customer selected or bought and are stored. Thereby, when the customer is ready to select or buy goods, it is possible to prepare a selection of articles, in accordance with the tendencies, before the customer actually inputs the selection. Thus, it is possible to reduce the time and the customer's labor required for article selection and buying operations.

In the fifth aspect of the present invention, by storing history information when the customer accessed the store previously, it is possible to provide appropriate screen image information for the customer based on the stored history information. For example, when the customer is already a member of the store (such a fact is stored as the history information), a display of the member registration screen image may be omitted. Further, when the customer was already shown the store introductions (such a fact is also stored as the history information), a display thereof may be omitted.

In the sixth aspect of the present invention, by storing times-the customer used the store previously as the history information, goods information being provided for the customer may be appropriately changed. For:example, there was no stock of articles at a time t1 in the store when the customer accesses the store. However, when the customer accesses the store at a time t2, stock of the articles has been filled. In such a case, by storing the time t1, it is recognized that there was no stock of the articles when the customer accessed the store previously. Then, it is possible to especially inform the customer that the stock of the articles is now filled the next time the customer accesses the store. Thereby, the customer can easily notice that the articles are now available. Thus, in a case where conditions of stocks and services in the store vary as time passes, it is possible to appropriately respond to such a variation by providing suitable shopping information for the customer.

In the seventh aspect of the present invention, by including a sum of money spent for goods at the store in the history information, it is possible that a special service such as a special bargain may be given for the customer whose total sum of money spent at the store is in excess of a predetermined amount. In such as case, a message indicating such a special service is displayed as a screen image.

According to the eighth aspect of the present invention, by including the customer's tendencies (tastes) in the history information, similar to the fourth aspect of the present invention, when the customer is ready to select or buy goods, it is possible to prepare a selection of articles, in accordance with the tendencies, before the customer actually inputs the selection. Thus, it is possible to reduce the time and the customer's labor required for article selection and buying operations.

According to the ninth and fourteenth aspects of the present invention, a display of the member registration screen image for the customer may be omitted as a result of recognizing that the customer is already a member of the store from the history information. Thereby, an article selection screen image is immediately displayed for the customer. The member registration screen image is used to register a new customer in the store and also register supplementary customer's personal information.

In the tenth and sixteenth aspect of the present invention, when the customer accesses the store, his or her access history is referred to and it is determined that he or she previously accessed the store. Thereby, a search is made for marked goods information which should be present because he or she accessed the store previously. Thus, the marked goods information is automatically extracted and shown to the customer. The customer can easily be shown the goods information of the articles about which the customer was previously curious.

In the related art, a customer always needs to be shown many screen images headed by an initial screen image and must click for each display of screen image until an article selection screen image is reached. However, according to the present invention, by storing a customer's history of article selection, history of store access and so forth, it is possible to reduce the number of screen images until the article selection screen of image is reached the next time the customer accesses the store. Thereby, it is possible to drastically reduce the time required for the online shopping, and thus reduce communications costs required for online data transmission.

Further, by storing the history information, a customer needs to perform a member registration operation only once. Thereby, labor born by the customer for performing the online shopping can be effectively reduced.

Further, when the marked goods information is provided for a customer, the customer's coming-to-store (store-accessing) history information may be referred to and also the particular customer's personal information such as his or her size, favorite color, etc., may be referred to. Thereby, it is possible to provide for the customer the minimum necessary screen images and thus to cause the customer to perform a click operation a minimum necessary number of times. Thereby, a load born by the customer can be effectively reduced.

Other objects and further features of the present invention will become more apparent from the following detailed description when read in conjunction with the accompanying drawings.

BRIEF DESCRIPTION OF THE DRAWINGS

FIG. 8 shows an example of a provisional order reception list in the first embodiment of the present invention;

FIG. 10 shows an example of a mark list display in the first embodiment of the present invention;

FIG. 18 shows an example of a screen image for member registration in the third embodiment;

FIG. 24 shows an example of a customer master file in a fourth embodiment of the present invention; and FIG. 25 shows an example of a size selection window which may be displayed on the screen image such as that shown in FIG. 7C.

DESCRIPTION OF PREFERRED EMBODIMENTS

First, an example of a process of marking information of an article about which a customer is curious, in a customer history management system in online shopping, will be described.

Figure 1:
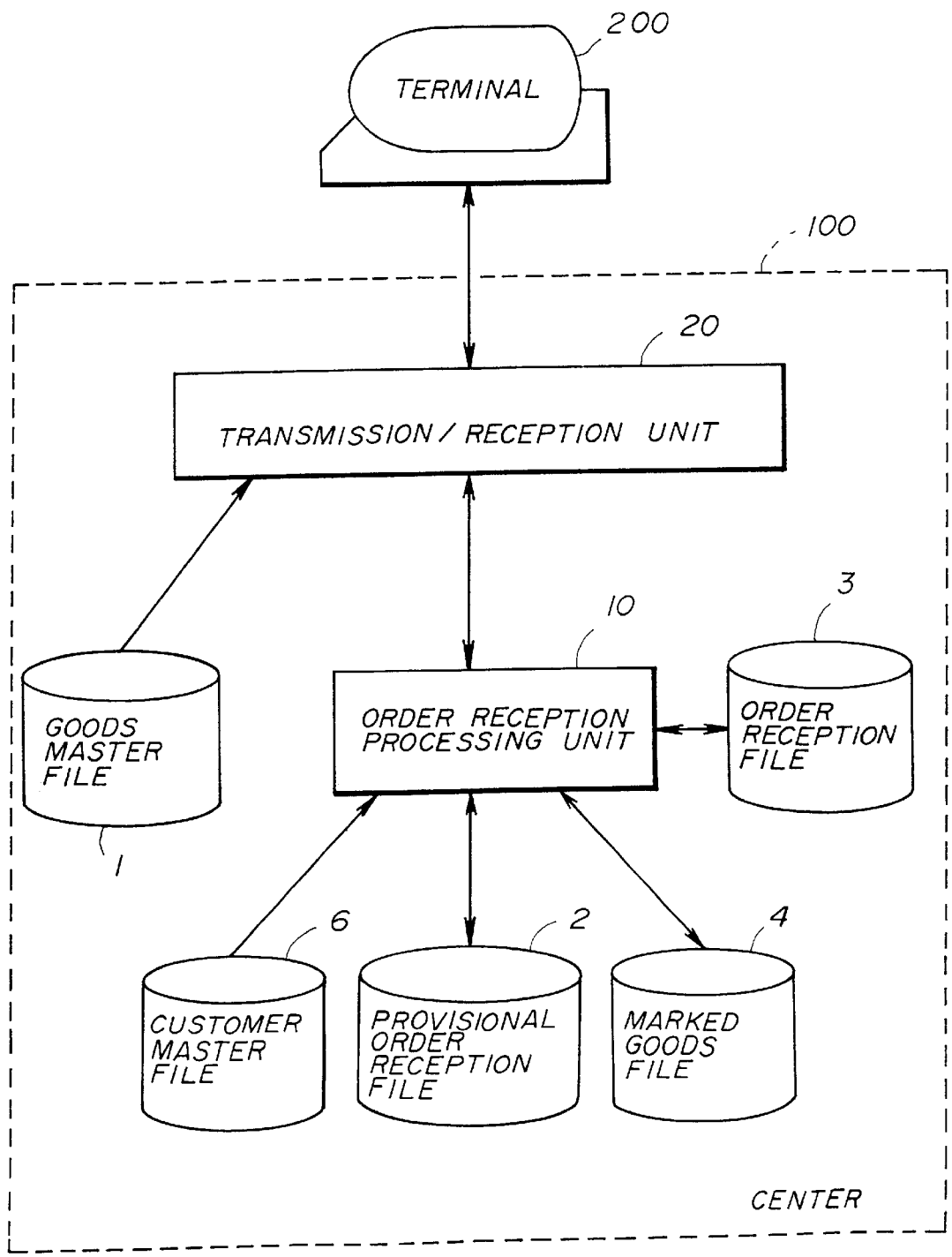
FIG. 1 shows a system 'structure in an example of a first system of the present invention.

FIG. 1 shows a system structure in an example of a first system of the present invention. The system shown in FIG. 1 includes a terminal 200 which generates a goods information provision request and has goods information provided therefor, and a center 100 which provides the goods information for the terminal 200 and provides screens of image information comprising the various goods information in response to instructions from the terminal 200.

The center 100 includes a goods master file 1 which stores information of particular goods (articles); a provisional order reception file 2 which stores goods selection information for goods which have been selected by customers but have not had final orders made therefore yet; a order reception file 3 which stores goods information for goods which have had final orders made therefore by customers; and a marked goods file 4. The marked goods file 4 stores goods information for goods which were merely selected by customers. Goods information for goods which have had actual orders made therefore is removed from goods information stored in the provisional order reception file 2. The remaining goods information is the above-mentioned goods information for goods which were merely selected by customers, which goods information is marked and stored in the marked goods file 4. The center 100 further includes a customer master file 6 which stores registration information for each customer; an order reception processing unit 10 which manages goods information for goods which were merely selected by customers and goods which have had actual orders made therefore by customers; and a transmission/reception unit 20 which performs information transfer between the center 100 and terminal 200. The terminal 200 includes an input unit (a keyboard or a pointing device) for a customer to input information, for example, for making an order for an article, to the terminal 200. The above-described first system of the present invention shown in FIG. 1 can be practiced using a general-purpose computer that is specially configured by predetermined software stored in a computer-usable medium. The above-mentioned files 1, 2,; 3, 4 and 6 shown in the figure can be practiced as individual data files, respectively, stored in one or a plurality of general-purpose storage devices, such as a hard disc drive device(s), a floppy disc drive device(s), a RAM(s) and/or the like. In a case where a plurality of files thereof are stored in a single common storage device, the storage area of the common storage device is allocated for the files individually in a well-known manner. The master files 1 and 6 may be data files, data of which can be updated, respectively.

Figure 2:
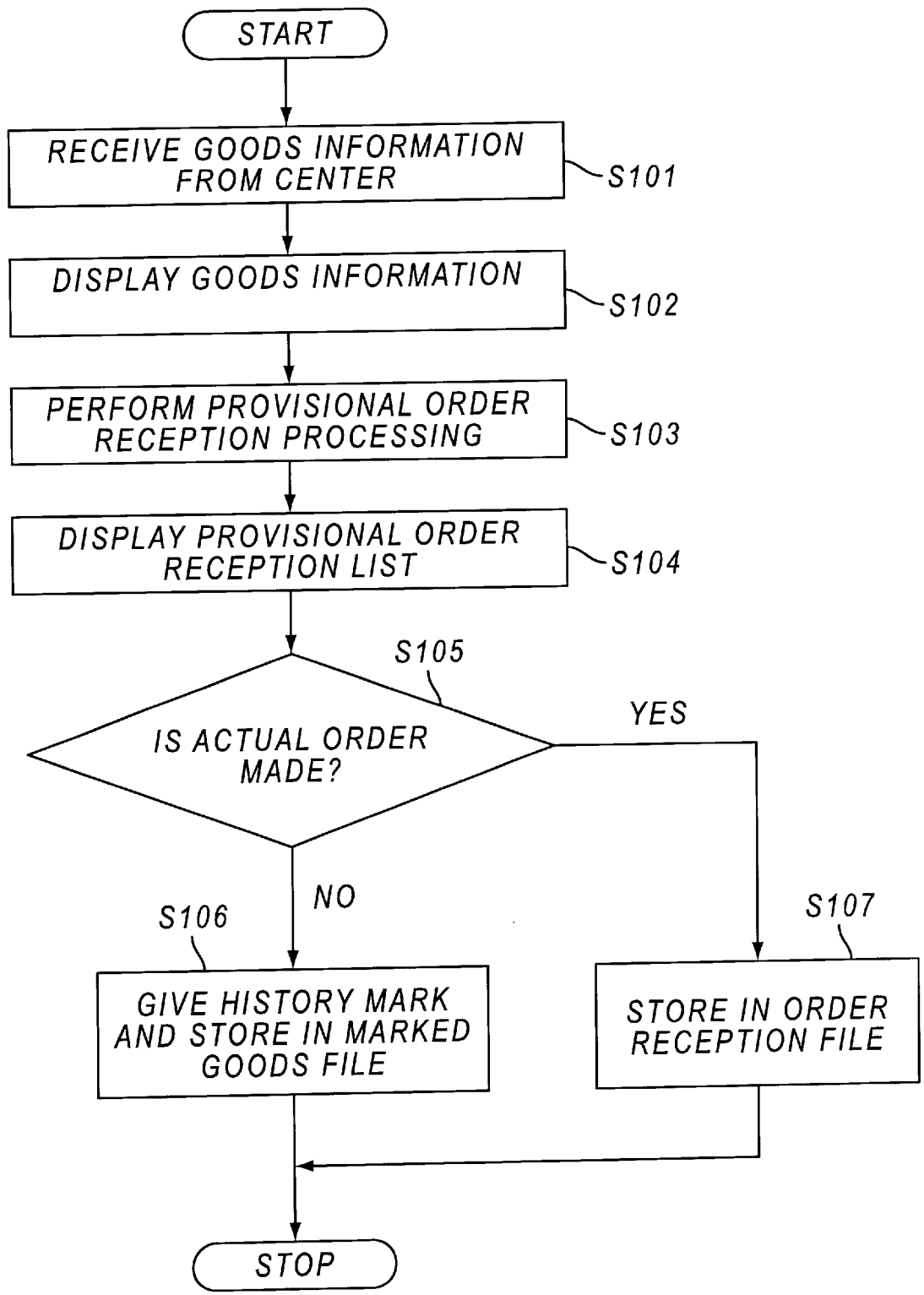
FIG. 2 shows an operation flowchart in an example of the system shown in FIG. 1.

FIG. 2 shows an operation flowchart of a series of operations which the first system of the present invention performs by executing the predetermined software.

Step S101) The center 100 accesses the goods master file 1, reads goods information and provides the read goods information for the terminal 200 through the online system. The terminal 200 receives the provided goods information.

Step S102) The terminal 200 displays the received goods information on a display unit thereof.

Step S103) A customer operates the terminal 200 and thus causes the goods information to be sequentially displayed on the display unit of the terminal 200. Then, the customer may make a provisional order for an article when the customer wishes to buy it. Specifically, the customer operates the pointing device of the terminal 200, moves a cursor and clicks when the cursor is located at information indicating that article the customer wishes to buy displayed on the display unit. (Such an operation of selecting something by clicking when the cursor is located at that thing or the information indicating that thing will be referred to as simply 'clicking something', hereinafter.) Thus, the customer makes a provisional order for the article. The provisional order information is transferred to the center 100 from the terminal 200. The order reception processing unit 10 of the center 100 gives a provisional order reception mark to the goods information of the provisionally ordered article stored in the provisional order reception file 2. Such a provisional order operation is repeated until all the customer's goods selection processing is finished.

Step S104) After all, the customer's goods selection processing is finished, the order reception processing unit 10 reads information stored in the provisional order reception file 2, produces a provisional order reception list and transmits the list to the terminal 200. The provisional order reception list includes the goods information concerning all the articles which the customer wishes to buy.

Step S105) The customer refers to the provisional order reception list which is displayed on the display unit of the terminal 200. Then, the customer may select articles from the provisional order reception list, which articles are those that the customer really wishes to buy and/or that the customer can buy with respect to the customer's budget. Thus, the customer may make an actual order. The goods information of the actually ordered articles is transmitted to the center 100 from the terminal 200. When an actual order is made in the step S105, a step S107 is performed. If no actual order is made in the step S105, a step S106,is performed.

Step S106) A history mark is given to goods information of an article which has had a provisional order made therefor but not an actual order made therefor. The marked goods information is stored in the marked goods file 4 for each customer.

Step S107) Goods information of an article which has had an actual order made therefor is stored in the order reception file 3.

Thus, a customer may select articles which the customer wishes to buy, and, if the customer so selects an article, the customer gives this information to the center 100. Then, at an ordering decision (payment processing) time, the center shows a list of the articles for which the customer has made provisional orders. The customer refers to the list and inputs ordering information for articles which the customer actually orders, the ordering number of each actually ordered articles, and so forth. The order reception unit 10 of the center 100 stores the goods information of the actually ordered articles in the order reception file 3. The goods information of articles which have had provisional orders made therefore but not actual orders made therefore is given history marks, edited for each customer and stored in the marked goods file 4.

Thereby, when the same customer accesses this first system of the present invention the next time, the goods information which has had the history marks given thereto is displayed. Specifically, after a customer clicks a 'mark list display' button displayed on the display unit of the terminal 200, a list of articles for which that customer made provisional orders but did not make actual orders until now is displayed.

An example of a second system of the present invention for giving a mark to goods information will be described.

Figure 3:
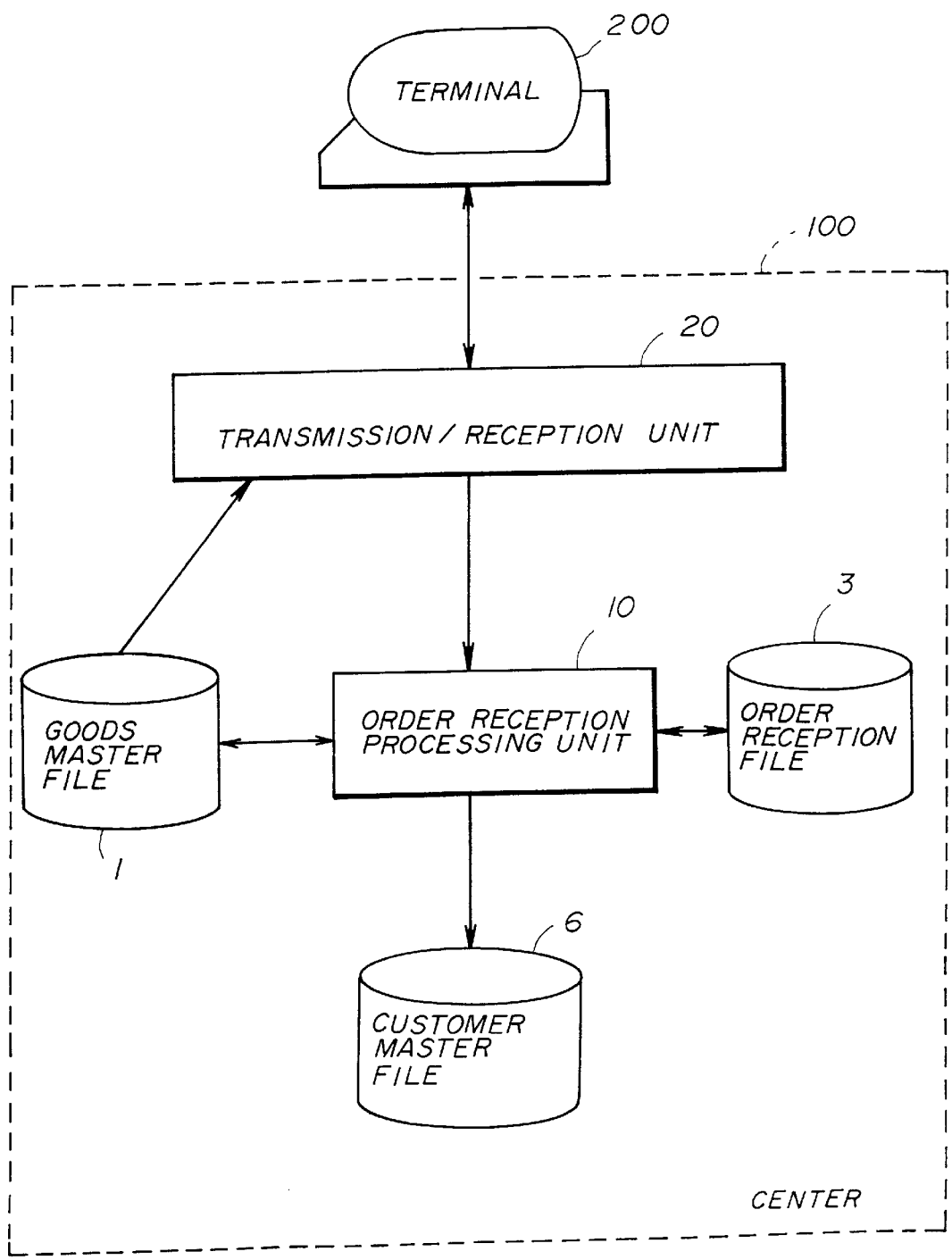
FIG. 3 shows a system structure in an example of a second system of the present invention.

FIG. 3 shows a system structure in an example of the second system of the present invention. In the second system, the center 100 includes the order reception processing unit 10, transmission/reception unit 20, goods master file 1 and order reception file 3. The above-described second system of the present invention shown in FIG. 3 can be practiced using a general-purpose computer that is specially configured by predetermined software stored in a computer-usable medium. The above-mentioned files 1, 3 and 6 shown in the figure can be practiced as individual data files, respectively, stored in one or a plurality of general-purpose storage device or devices such as a hard disc drive device(s), a floppy disc drive device(s), a RAM(s) and/or the like. In a case where a plurality of files thereof are stored in a single common storage device, the storage area of the common storage device is allocated for the files individually in a well-known manner. The master files 1 and 6 may be data files, data of which can be updated, respectively.

Figure 4:
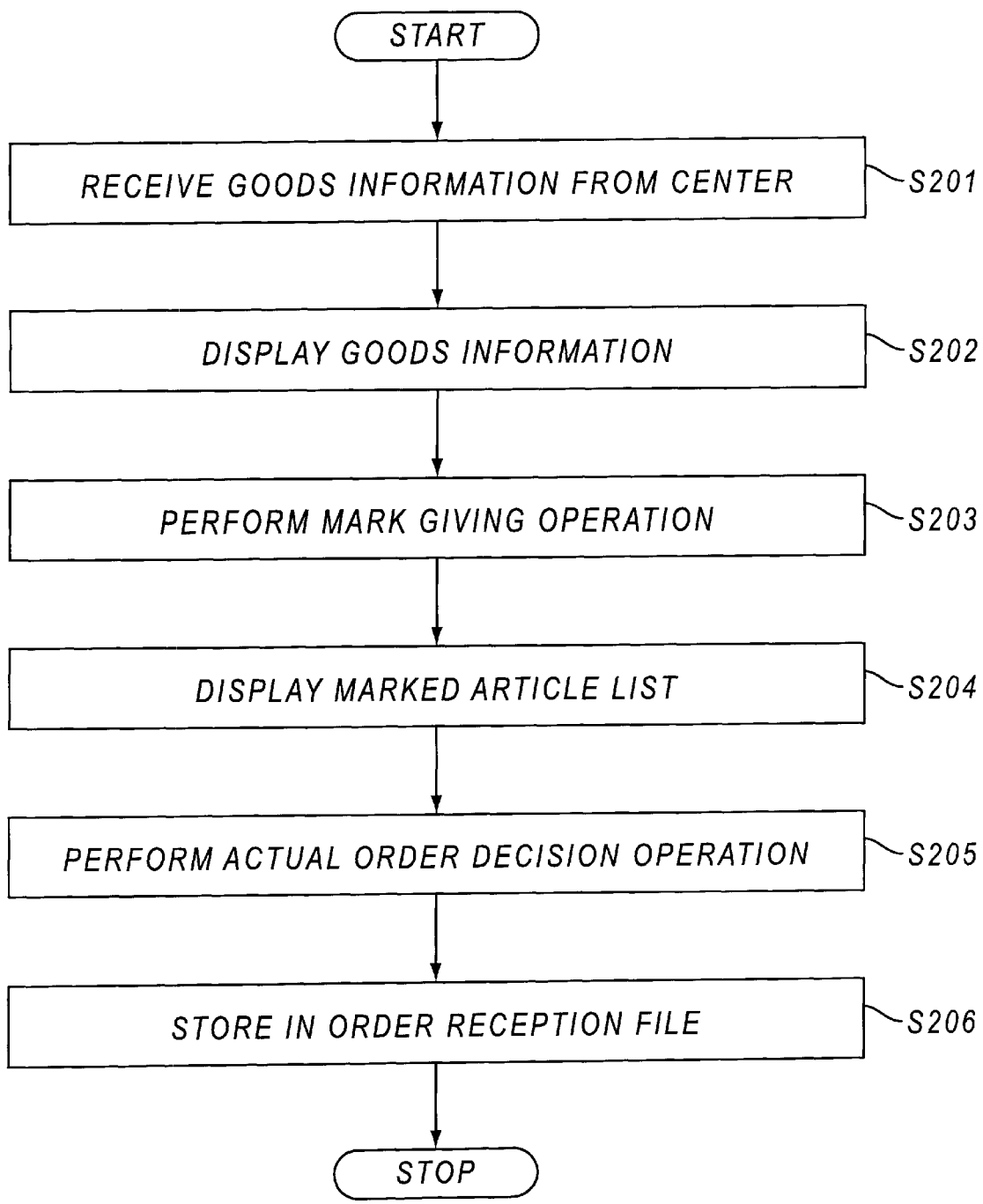
FIG. 4 shows an operation flowchart in an example of the system shown in FIG. 3.

FIG. 4 shows an operation flowchart of a series of operations which the second system of the present invention performs by executing the predetermined software.

Step S201) The center reads goods information from the goods master file 1, provides the read goods information for the terminal 200 through the online system and the terminal 200 receives the provided goods information.

Step S202) The terminal 200 displays the received goods information on the display unit thereof for a customer.

Step S203) The customer may give the history mark to goods information of an article which the customer wishes to buy. Specifically, the customer may click a specified part on the screen of the display unit. Thereby, the order reception unit 10 stores in the order reception file 3 the marked goods information and information indicating that that goods information has been marked.

Step S204) After the mark giving operation in the step S203 is finished, the marked information is read out from the order reception file 3, and a list of all the articles to which the customer gave the history marks in the step S203 is displayed.

Step S205) The customer refers to the displayed list, and makes a decision of actual ordering.

Step S206) Actual order marks are given to goods information of articles for which the customer made a decision of actual ordering in the step S205. The giving of actual order. marks may be replaced by inputting a cost of each actually ordered article. The actual-order marked goods information is stored in the order reception file 31.

Thereby, when the same customer wishes to refer to that goods information again, the information indicating that the goods information was marked is read out, the goods information which has the history marks given thereto in the step S203 is read out and the read goods information is transmitted to the terminal 200. Then, by causing the transmitted goods information to be displayed through the terminal 200, the customer can obtain the goods information of all the articles about which the customer was previously curious, without a search therefor.

A system of the present invention for managing a customer access history which is a history of cases in which a customer accesses information of particular stores provided in the online shopping will be described.

Figure 5:
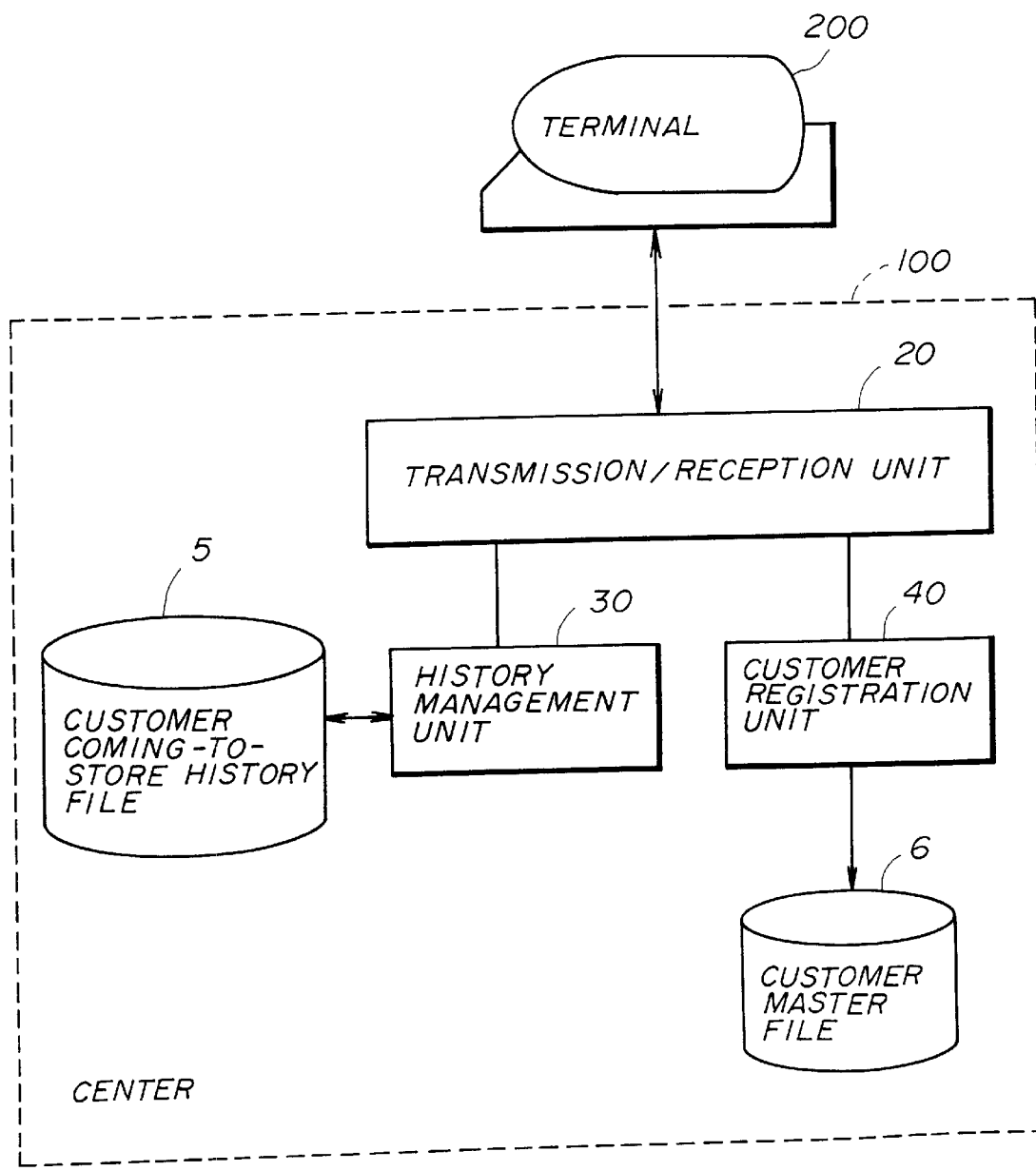
FIG. 5 shows a system structure in an example of a customer coming-to-store history management system of the present invention.

FIG. 5 shows a system structure in an example of a customer coming-to-store history management system of the present invention. The center 100 includes a history management unit 30 which manages a history of customers' coming to (accessing) stores, a customer registration unit 40 which manages information of customers who initially come to (first access) stores, the transmission/reception unit 20 which performs data transfer between the terminal 200 and the units 30, 40 of the center 100, a customer coming-to-store history file 5 and the customer master file 6 which stores information produced by the customer registration unit 40. The above-described system of the present invention shown in FIG. 5 can be practiced using a general-purpose computer that is specially configured by predetermined software stored in a computer-usable medium. The above-mentioned files 5 and 6 shown in the figure can be practiced as individual data files, respectively, stored in one or a plurality of general-purpose storage device or devices such as a hard disc drive device(s), a floppy disc drive device(s), a RAM(s) and/or the like. In a case where a plurality of files thereof are stored in a single common storage device, the storage area of the common storage device is allocated for the files individually in a well-known manner. The master file 6 may be a data file, data of which can be updated.

Figure 6:
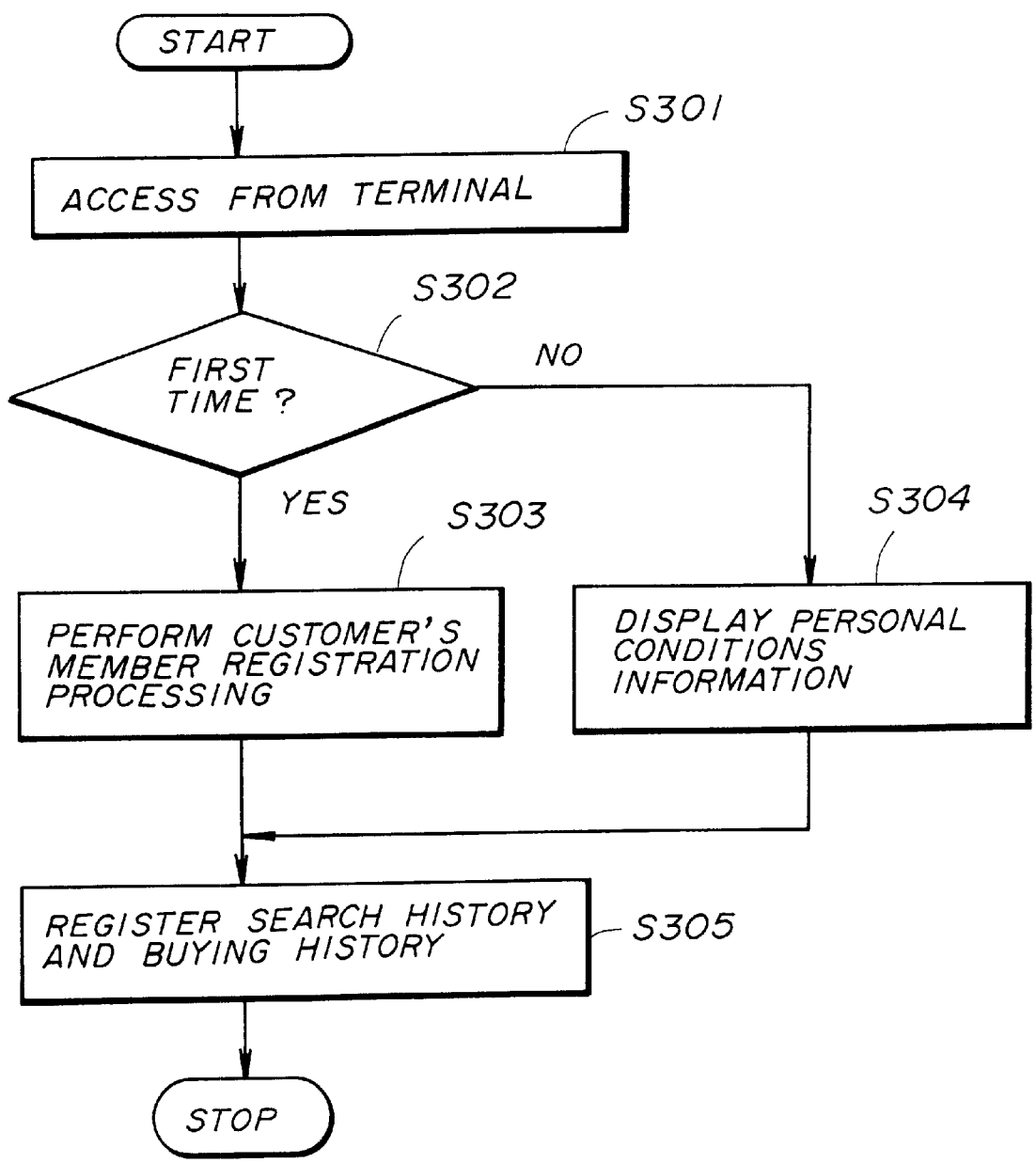
FIG. 6 shows an operation flowchart in an example of the system shown in FIG. 5.

FIG. 6 shows an operation flowchart of a series of operations which, the system of the present invention shown in FIG. 5 performs by executing the predetermined software.

Step S301) A customer accesses information of a store through the terminal 200, that is, the customer inputs a specification to the terminal 200 for specifying the store. When the customer accesses the information of the store as mentioned above, if the customer is a member of the store or of a mall including the store, a member number should be input to the terminal 200.

Step S302) When information of a store is accessed by a customer but no member number of the customer is input (null), the center 100 determines that the customer initially (first time) accesses the information of the store. Then, a step S303 is performed. When information of a store is accessed by a customer and also a member number of the customer is input, the center 100 determines that the customer has been registered as a member of the store. Then, a step S304 is performed.

Step S303) The center performs member registration processing of the customer and then step S305 is performed. It is preferable that member registration items include a name of a customer, personal information such as the address of the customer, and information by means of questionnaire. The information by means of questionnaire may include the size, taste and so forth of the customer. That information is stored and may be used for sales promotion.

Step S304) The history management unit 30 reads the history information of the customer from the customer coming-to-store file 5. The history management unit 30 refers to the read history information of the customer and sends various messages and goods information of the store to the terminal 200. Further, if any special event such as a bargain sale is performed at this date/time, this information is also sent to the terminal 200.

Step S305) The terminal 200 displays on the screen of its display unit the sent various goods information, event information and various messages. The customer searches the displayed information for various goods, inputs information for making an order for goods and sends the information to the center 100 through the terminal 200. Thereby, the history management unit 30 obtains, for each customer, the customer's search conditions, search time, articles for which the customer made orders and so forth, stores the information in the customer coming-to-store history file 5 as customer coming-to-store history information.

Thereby, for each customer who is a member of a store, screens of image information of the store particularly for the shopping of the customer can be provided when the customer accesses the store through the terminal 200.

With reference to the figures, embodiments of the present invention will be described.

First Embodiment

First processing for giving a mark to information of an article about which a customer is curious, in a customer order reception history management system in a first embodiment of the present invention, will be described.

Figure 7A:
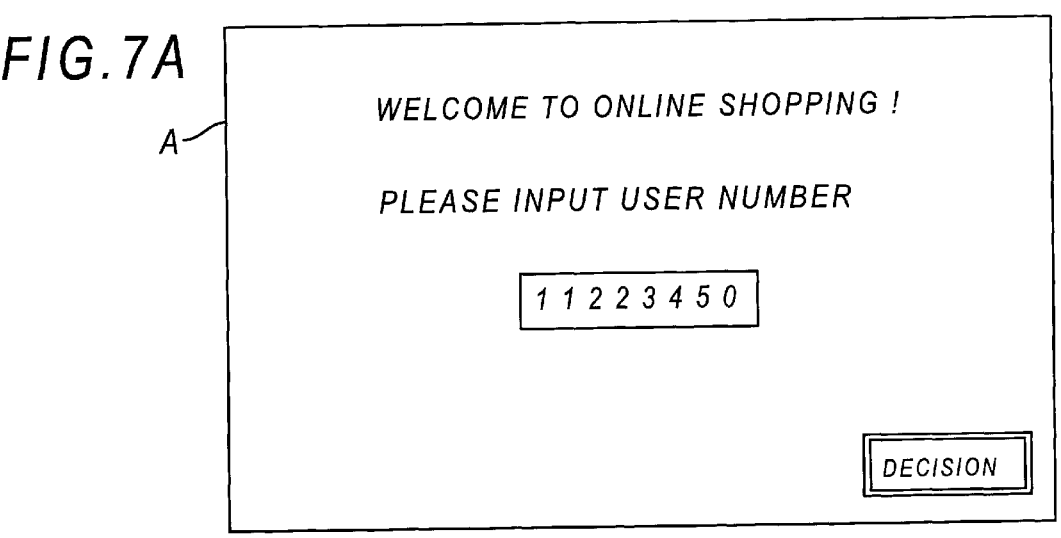
FIGS. 7A, 7B and 7C illustrate marking processing in a first embodiment of the present invention.
Figure 7B:
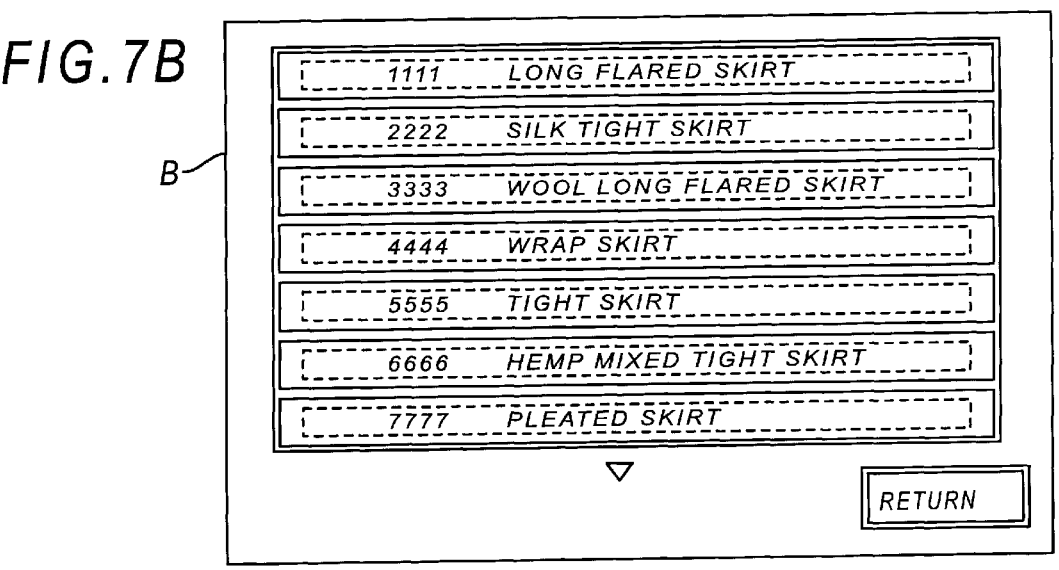
Figure 7C:
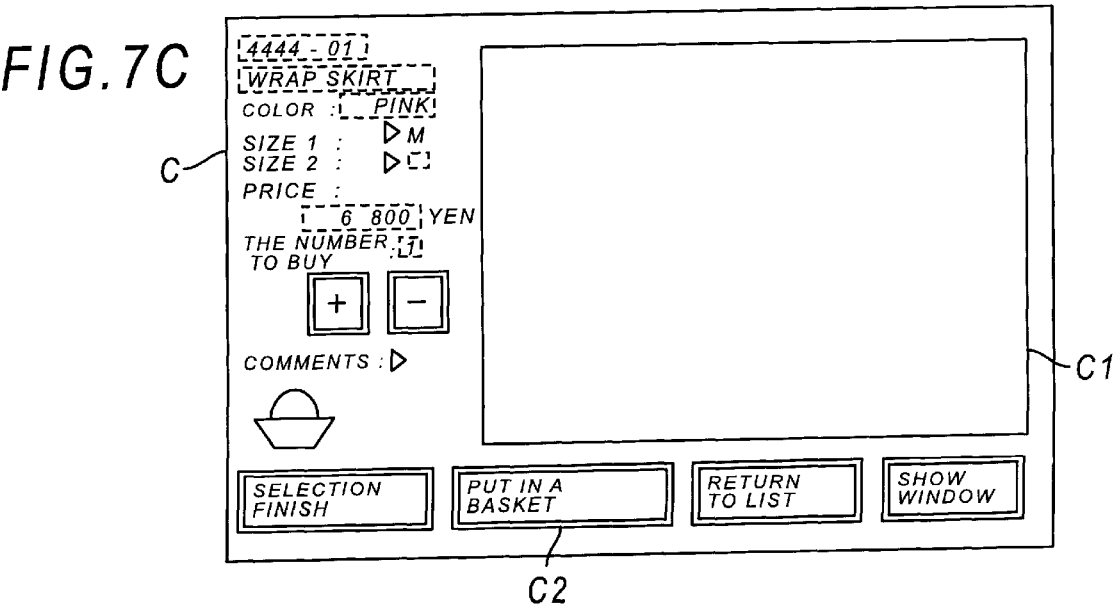

FIGS. 7A, 7B and 7C illustrate mark giving processing in the first embodiment of the present invention. Operations of the first embodiment will be described based on the operations described above with reference to FIGS. 1 and 2.

(1) First, a customer accesses the center 100 for online shopping.

(2) The center 100, when accessed by the customer, transmits information of a screen image A shown in FIG. 7A to the terminal 200. The terminal 200 displays the screen image A. The customer inputs a user number and clicks a 'decision' button displayed on the screen image A.

(3) Then, the center 100 transmits, as a next screen image, information of a screen image B shown in FIG. 7B to the terminal 200. The terminal 200 displays the screen image B. The customer selects '4444' (a wrap skirt) as a kind of goods from the information of the screen image B.

(4) The center 100 obtains the information of a screen image C shown in FIG. 7C from the goods master file 1, and transmits the information to the terminal 200. The customer refers to a pattern (graphics) displayed in a window CL, of the screen image C and so forth, and, if the customer wishes to buy the article displayed in the screen image C, clicks a box C2 with a phrase 'put in a basket' displayed in the screen image C. The phrase 'put in a basket' is used for assuming a condition where a customer puts an article in the customer's hand basket but does not perform payment therefor. That is, in this condition, the customer can return the put-in-the-basket article to a goods shelf without actually buying it. When the customer clicks the box C2, with the phrase 'put in a basket', the center 100 stores the goods information of the article in the provisional order reception file 2 together with the information of the customer. It is assumed that a total of five articles are selected (put in the basket) as a result of repetition of an operation such as that described above. Then, when the customer clicks a box with a phrase 'selection finish' shown in the screen image C shown in FIG. 7C, the order reception processing unit 10 of the center 100 stores the goods information of the selected articles in the provisional order reception file 2.

(6) Then, the order reception processing unit 10 reads the stored information from the provisional order reception file 2, and transmits screen image information shown in FIG. 8 to the terminal 200.

(7) The customer clicks each displayed article which the customer really wishes to buy, from a displayed provisional order reception list shown in FIG. 8. The center 100 stores the goods information of the clicked articles in the order reception file 3 together with the customer information. The center 100 stores the remaining goods information of the articles, which are included in the displayed provisional order reception list but not clicked, in the marked goods file 4 together with the customer information.

Figure 9:
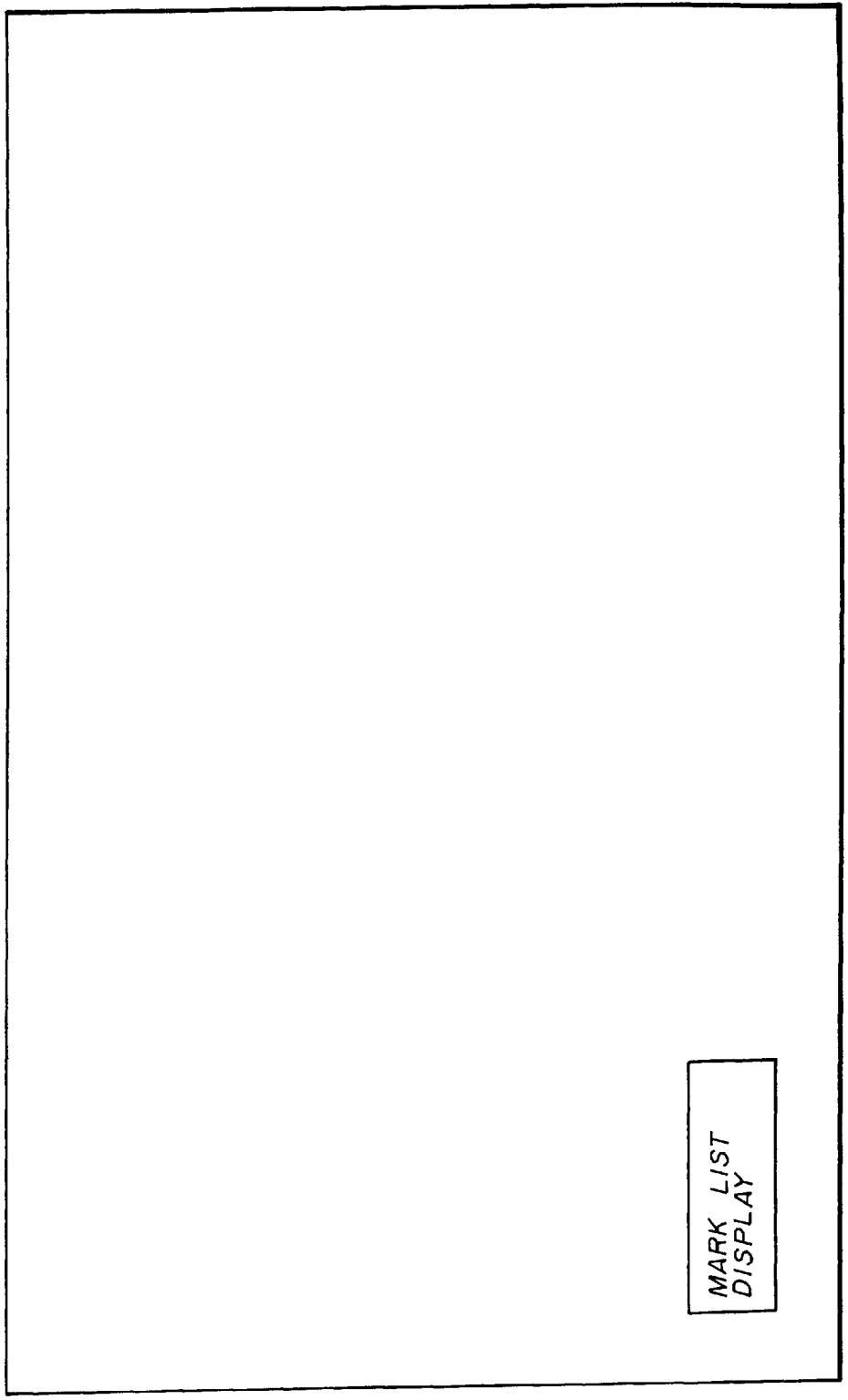
FIG. 9 shows an example of a screen image displayed at a time of re-access.

(8) Then, when the customer accesses the customer order reception history management system in the first embodiment again, the center 100 reads the stored information from the marked goods file 4 and displays a screen image shown in FIG. 9 on the display unit of the terminal 200. Then, when the customer clicks a displayed 'mark list display' box, a list of the goods information of the articles which were selected in the above-mentioned step (6) but not bought in the above-mentioned step (7), shown in FIG. 10, is displayed. At this time, by having previously stored in the provisional order reception file 2 the date at which the selection of the step (6) was performed, it is possible that a message including the access date is displayed, as shown in FIG. 10.

Further, it is also possible to display goods information of articles stored in the marked goods file 4 in an order of the number of times the goods information was accessed. When articles are bought from the articles, for which the goods information is stored in the marked goods file 4, the goods information is canceled in the marked goods file 4.

(9) It is possible that when the customer clicks a displayed article number '4444-01', for example, from the displayed list of the goods information shown in FIG. 10, the screen image C, shown in FIG. 7C, is again displayed. Such a function is effective in a case where the customer forgets the contents of a previously selected article because many days have elapsed from the selection date.

By the above-described operations, in a case where a customer cannot make up his or her mind to actually buy goods, it is possible to cause a list of goods information of goods which were selected by the customer to be displayed before the customer makes a final decision to buy goods. Therefore, the customer can make a final decision to buy goods after referring to the displayed list.

Second Embodiment

In a customer order reception history management system in a second embodiment of the present invention, a second processing for marking an article about which a customer is curious will be described.

The second embodiment will be described based on the arrangement and operations shown in FIGS. 3 and 4.

The above-described operations of the steps (1), (2), (3) and (4) of the first embodiment are similar to those of the second embodiment. Therefore, the descriptions thereof will be omitted.

Figure 11:
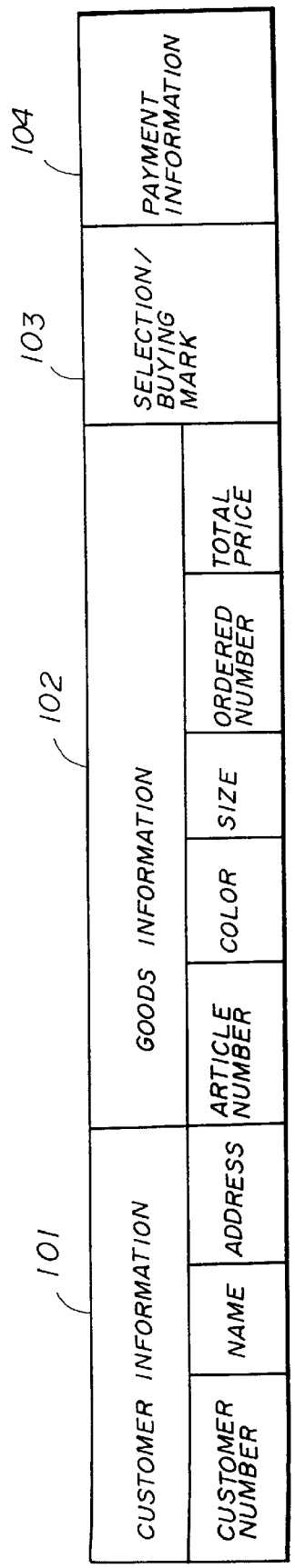
FIG. 11 shows an example of a format of an order reception file in a second embodiment of the present invention.

(5) In the screen image C shown in FIG. 7C, when the customer clicks the 'put in a basket' box C2, the order reception processing unit 10 stores the displayed goods information together with the customer information in the order reception file 3. At this time, the goods information is given a mark indicating that the article has been selected. FIG. 11 shows an example of the order reception file 3. The order reception file 3 shown in the figure includes the customer information 191 comprising customer (identification) number, name and address; goods information 102 comprising article (identification) number, color, size, number of articles and price; a mark 103; and payment information 104. When a customer makes a final order for an article, the mark indicating that the article has been selected is set as the mark 103 of that article. Specifically, '1' is set as the mark 103 when a customer buys an article and '0' is set as the mark 103 when the customer merely selects the article.

(6) Then, the information stored in the order reception file 3 is transferred to the terminal 200. At this time, because the information stored in the order reception file 3 is stored after the customer clicks the 'put in a basket' box C2 and thus merely selects the articles, each stored information has the mark 103 of '0'. Then, the terminal 200 displays a screen image similar to that shown in FIG. 8. The customer clicks articles which the customer really wishes to buy. As a result, '1' is set as the mark 103 of the information stored in the order reception file 3 for each article, the goods information of which has been clicked as mentioned above.

(7) Then, when the customer accesses the system in the second embodiment on some other day, a screen image similar to that shown in FIG. 9 is displayed. Then, when the customer clicks the displayed 'mark list display' box, the order reception processing unit 10 obtains each goods information 102 accompanied by the mark 103 of '0' from the order reception file 3. The obtained goods information 102 is used, image information such as that shown in FIG. 10 is thus produced therefrom and the produced image information is provided for the terminal 200.

Thus, through the second embodiment, because articles which a customer previously selected but did not buy are articles about which the customer was curious, when the customer again accesses the system after selecting a kind of goods, a display is given for indicating that a mark list (that is, a list of the selected kind of goods) can be displayed. Thereby, the customer can see record of the goods selection during a previous shopping. As a result, the customer does not need to always search the entirety of the goods information by following the standard order. The customer can immediately access goods information of articles which the customer previously selected. Therefore, the time required for search can be effectively reduced.

Further, through this method of the second embodiment, the marked goods file and provisional order reception file used in the first embodiment are not used, and only the order reception file is used for the overall customer order reception management including management of provisional order reception cases (that is, cases where merely selection is made). It is also possible that an identification number of a screen image (such as that shown in FIG. 7C) of each article is added to the goods information 102 of the order reception file 3, and, directly, the screen image of the article is read out from a screen image file (not shown in the figures) using that identification number and is transmitted to the terminal 200.

Third Embodiment

A system for management of customer's history in a third embodiment of the present invention will be described.

In the third embodiment, history information including an order reception (buying) history for each customer is processed.

Figure 12:
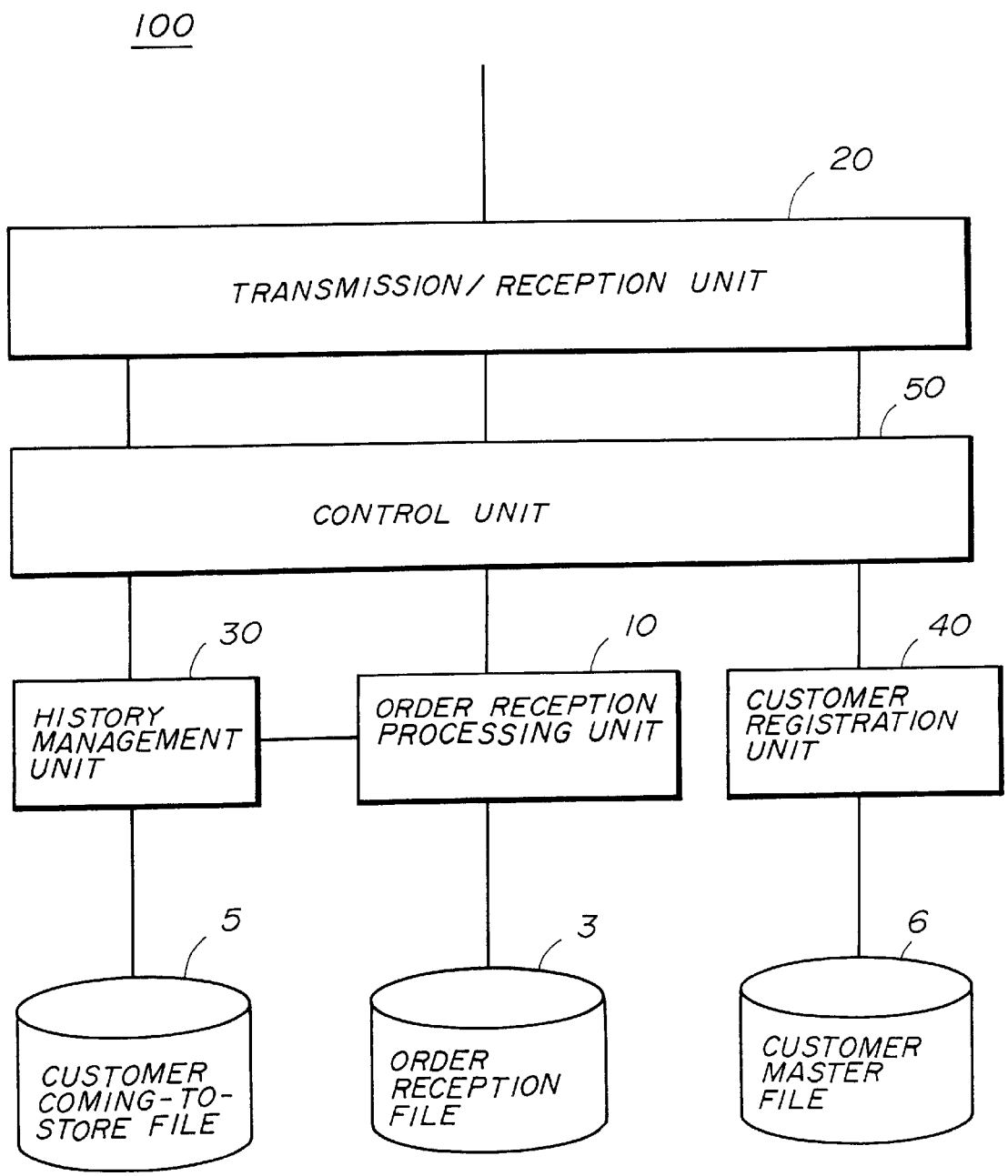
FIG. 12 shows a structure of a center in a customer history management system in a third embodiment of the present invention.

FIG. 12 shows a structure of the center 100 in a customer history management system in the third embodiment of the present invention. The center 100 includes the order reception processing unit 10, transmission/reception unit 20, history management unit 30, customer registration unit 40, a control unit 50, the customer coming-to-store history file 5, order reception file 3 and customer master file 6. The above-described system in the third embodiment of the present invention shown in FIG. 12 can be practiced using a general-purpose computer that is specially configured by a predetermined software stored in a computer-usable medium. The above-mentioned files 5, 3 and 6 shown in the figure can be practiced as individual data files, respectively, stored in one or a plurality of general-purpose storage devices or devices such as a hard disc drive device(s), a floppy disc drive device(s), a RAM(s) and/or the like. In a case where a plurality of files thereof are stored in a single common storage device, the storage area of the common storage device is allocated for the files individually in a well-known manner. The master file 6 may be a data file, data of which can be updated, respectively.

Figure 13:
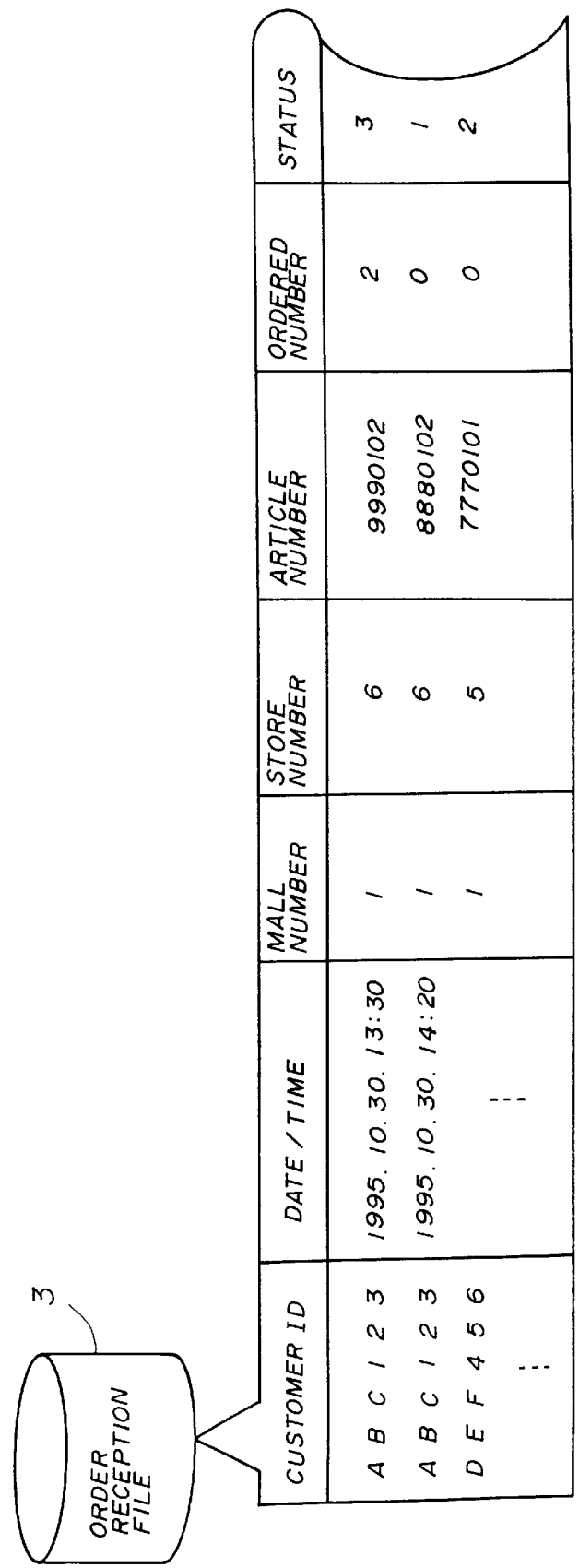
FIG. 13 shows an example of an order reception file in the third embodiment of the present invention.

The order reception file 3 includes, as shown in FIG. 13, customer IDs (IDentification numbers), order reception dates/times, mall numbers which indicate identification numbers of groups of stores assuming shopping malls respectively, store numbers which are given to respective stores, article numbers of ordered articles, ordered numbers of the articles and status. The 'statuses' represents conditions of the order reception file 3 for respective selection/order-reception cases stored in the file 3. In a case where merely a selection is made but no actual order is made, a number '1' is given as the 'status' for the case. In a case where an actual order has been made, a number '2' is given as the 'status' for the case. In a case where payment has been done and also the ordered articles have been shipped, a number '3' is given as the 'status' for the case. An 'article number' is given for each article and comprises numbers which represent the article kind, color, size and so forth, respectively.

Figure 14:
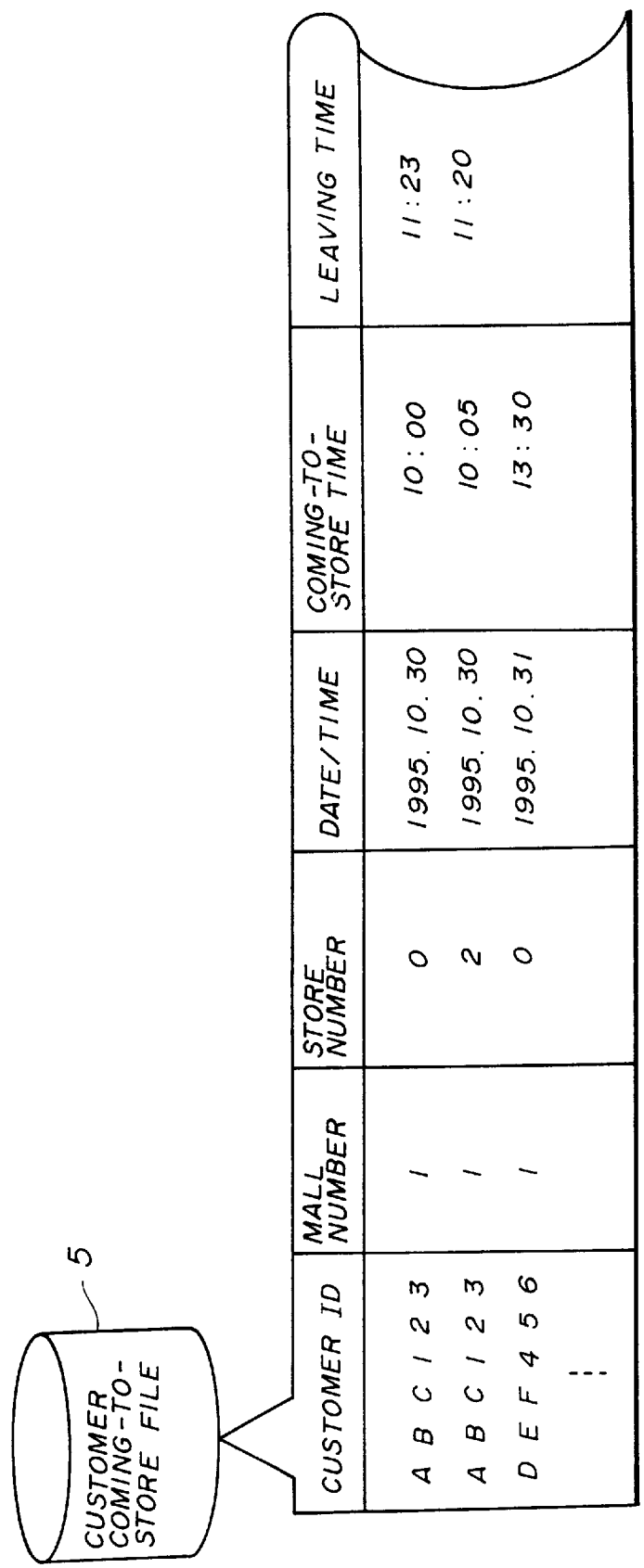
FIG. 14 shows an example of a customer coming-to-store file in the third embodiment of the present invention.

The customer coming-to-store file 5 includes, as shown in FIG. 14, the customer IDs, mall numbers, store numbers, dates/times, coming-to-store times and leaving times. Sin the third embodiment, the mall numbers are used. However, it is not necessary to be limited to this method. In a case where stores do not form a group such as a mall, only the store numbers may be included. For example, the top two cases both headed by the customer ID of 'ABC123' shown in FIG. 14 are cases where, as shown in the figure, the customer 'ABC123' came to the mall '1', at 10:00, Oct. 30, 1995, came to the store '2' at 10:05, the same date, left the store at 11:20, the same date, and left the mall at 11:23, the same date.

Figure 15:
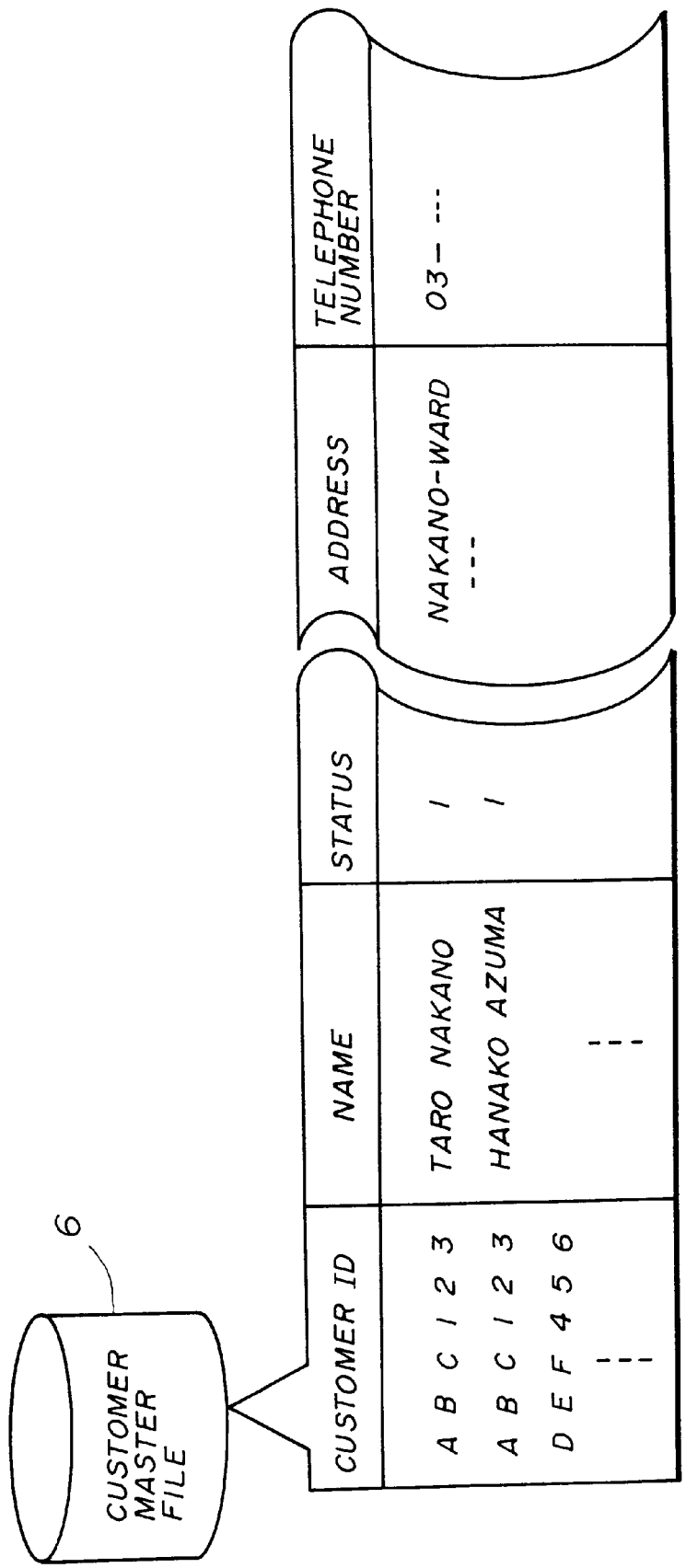
FIG. 15 shows an example of a customer master file in the third embodiment of the present invention.

As shown in FIG. 15, the customer master file 6 includes the customer IDs, names, statuses, addresses, telephone numbers and so forth.

Figure 16:
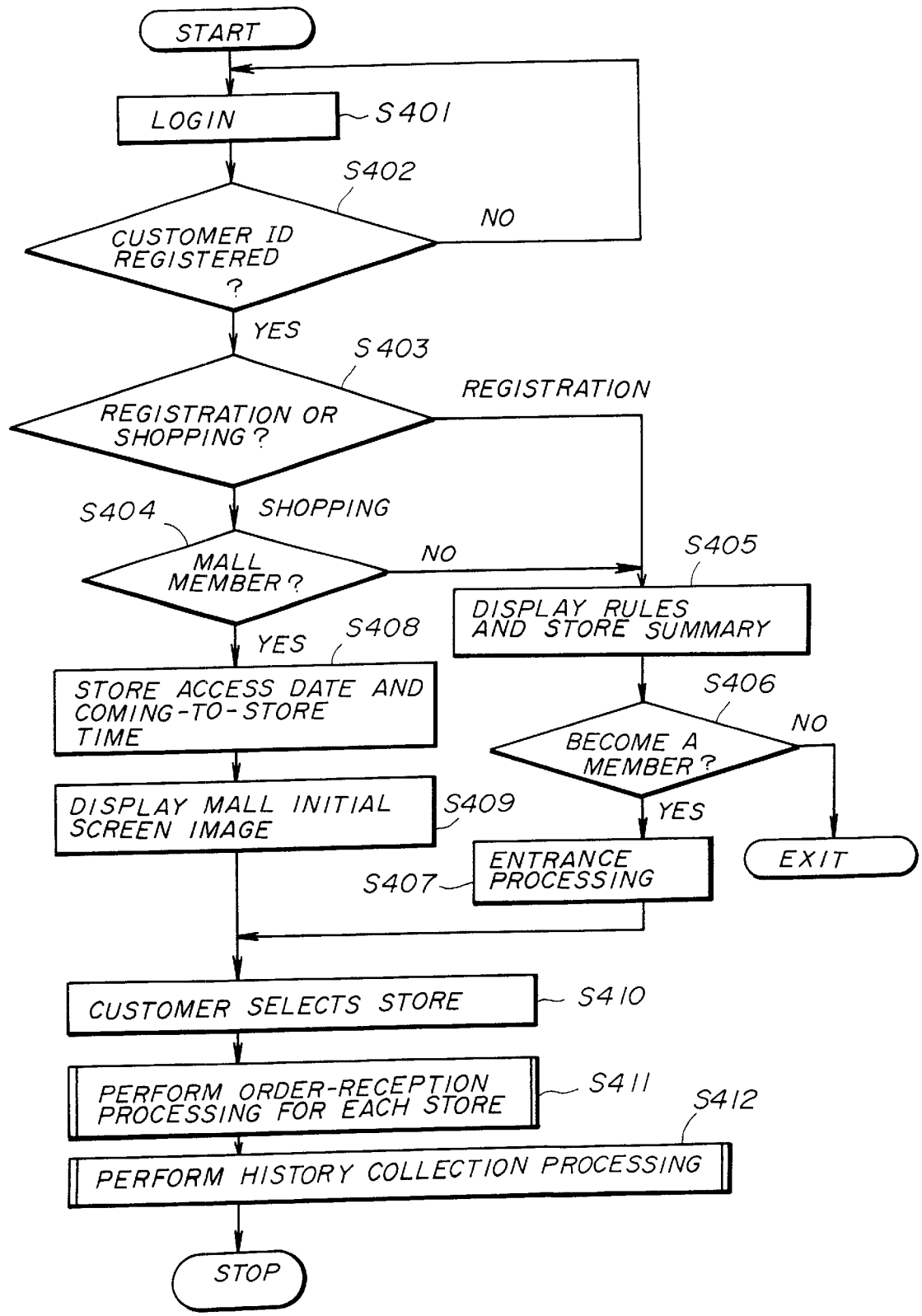
FIG. 16 shows an operation flowchart of the third embodiment of the present invention.

FIG. 16 shows an operation flowchart of a series of operations which the system of the present invention shown in FIG. 12 performs by executing the predetermined software.

Step S401) The terminal 200 performs login to the center 100.

Step S402) The control unit 50 of the center 100 checks the customer ID which a customer inputs through the terminal 200 in the step S401. When it is determined that the checked customer ID is not an ID which has been registered in the center 100, then, the step S401 is again performed. When it is determined that the checked ID is an ID which was registered in the center, then, a step 403 is performed.

Figure 17:
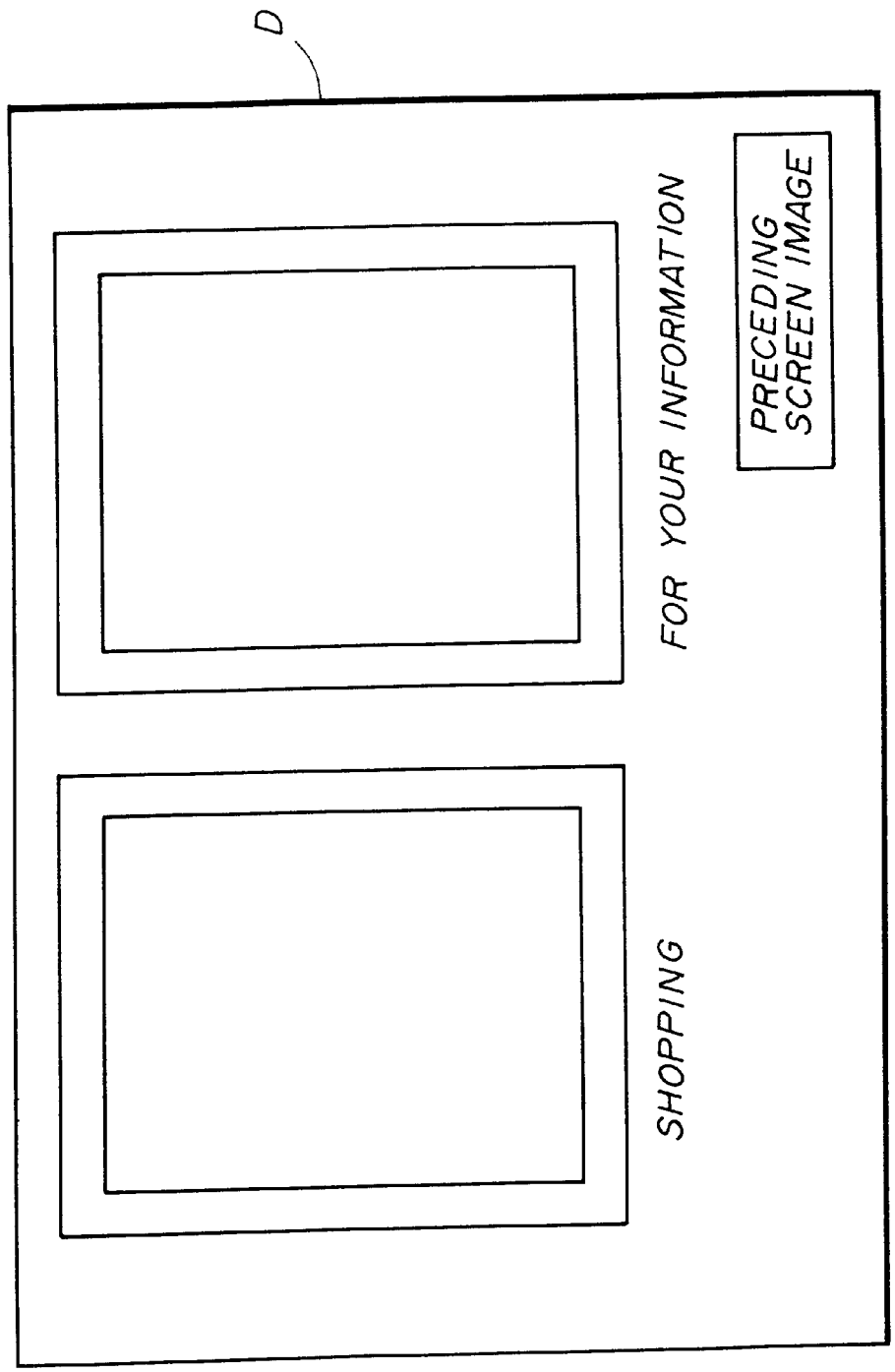
FIG. 17 shows an example of a screen image for selecting between shopping and registration in the third embodiment.

Step S403) Information of a screen image D shown in FIG. 17 is transmitted to the terminal 200 which then displays the screen image D. Then, when the customer selects a displayed word 'shopping' by clicking, a step S404 is performed. When the customer selects a displayed phrase 'for your information' by clicking, a step S405 is performed.

Step S404) The customer master file 6 is referred to and thus it is determined whether or not the accessing customer is a member of the mall. If it is determined that the customer is not a member of the mall, a step S405 is performed. When it is determined that the customer is a member of the mall, a step S408 is performed.

Step S405) This step is performed for a case where a member registration is performed, or a customer wishes to register further information. First, the center 100 displays rules of this online shopping system and introduction information of each store, for the customer through the terminal 200.

Step S406) A query as to whether or not the customer wishes to become a member of the mall is given to the customer through the terminal 200. When it is determined that the customer wishes to become a member of the mall through the customer's clicking, a step S407 is performed. When it is determined that the customer does not wish to become a member of the mall, the current operation is terminated.

Figure 19:
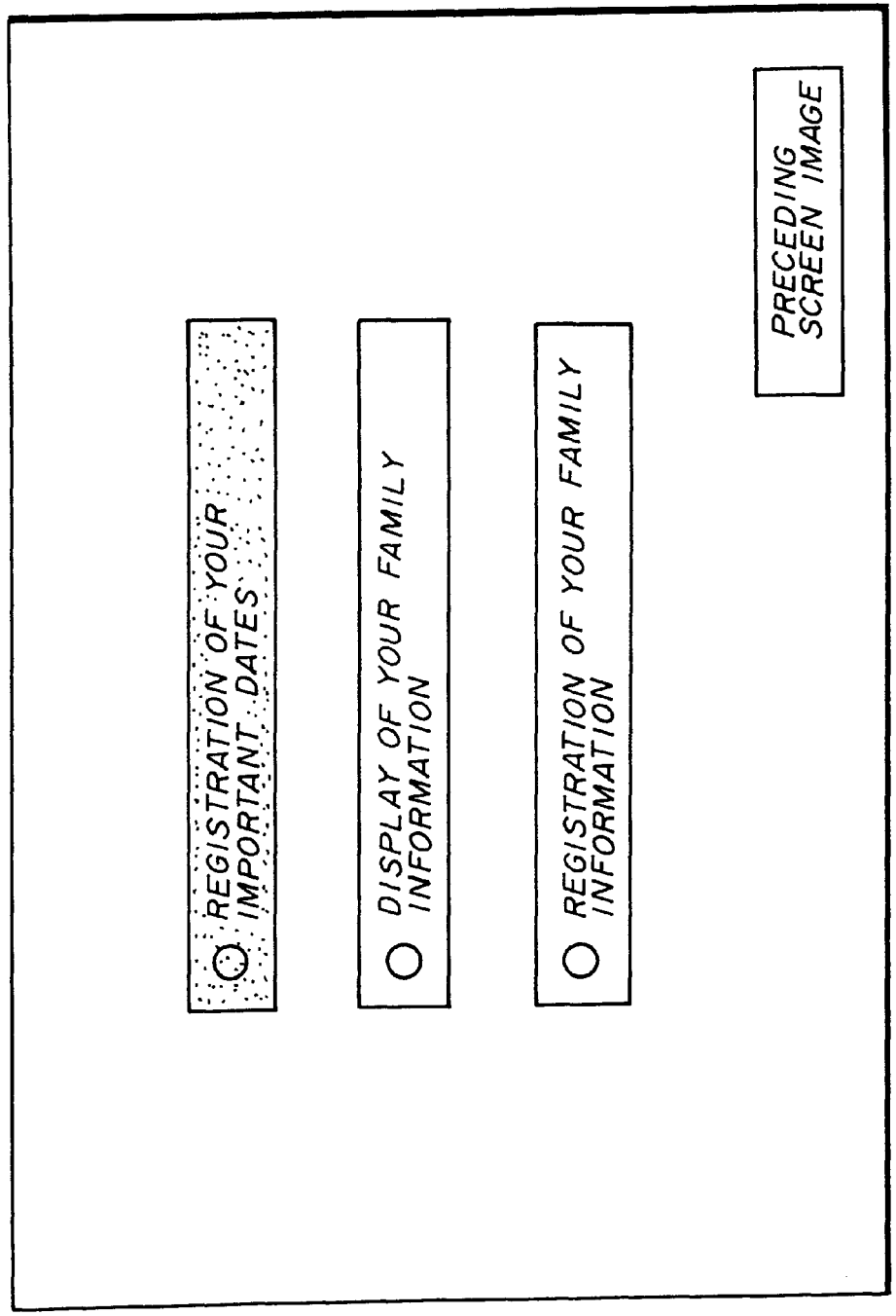
FIG. 19 shows an example of a screen image for registering other information in the third embodiment.
Figure 20:
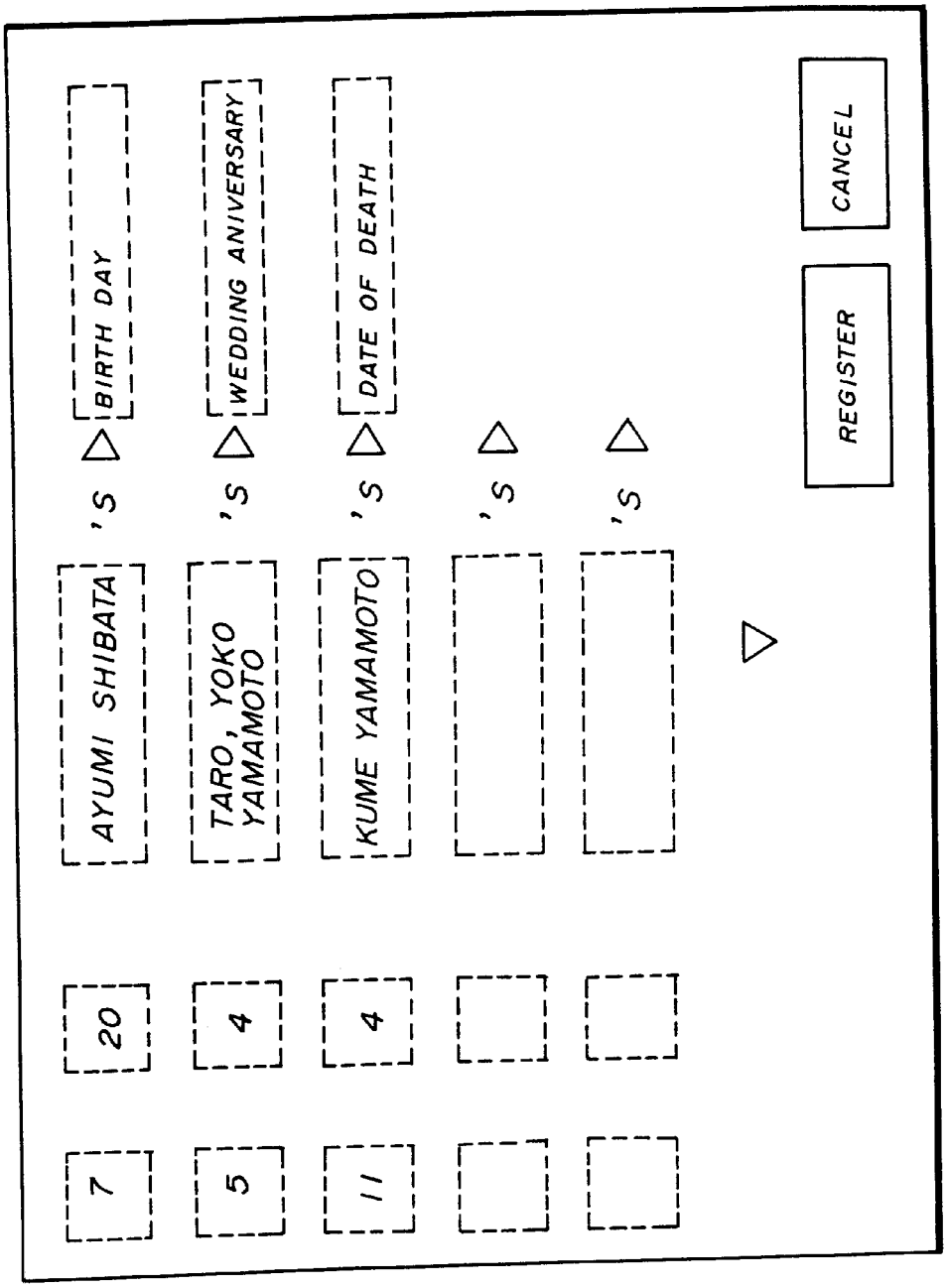
FIG. 20 shows an example of a screen image for registering supplementary information in the third embodiment.

Step S407) In order to cause the customer to become a member of the mall, information of a screen image shown in FIG. 18 is transmitted to the terminal 200 which then displays the screen image. With reference to the displayed screen image, the customer inputs information for each item. Further, it is also possible for the customer to register various supplementary information such as that shown in FIG. 19. When the customer clicks a 'registration of your important dates' box, a screen image shown in FIG. 20 is displayed. Then, the customer inputs necessary information according to instructions shown in the screen image. Then, a step S410 is performed.

Step S408) When it is determined in the step S404 that the customer is a member of the mall, the time the customer accesses (comes to) the mall and the time the customer assesses (comes to) a store in the mall are determined and stored in the customer coming-to-store history file 5.

Figure 21:
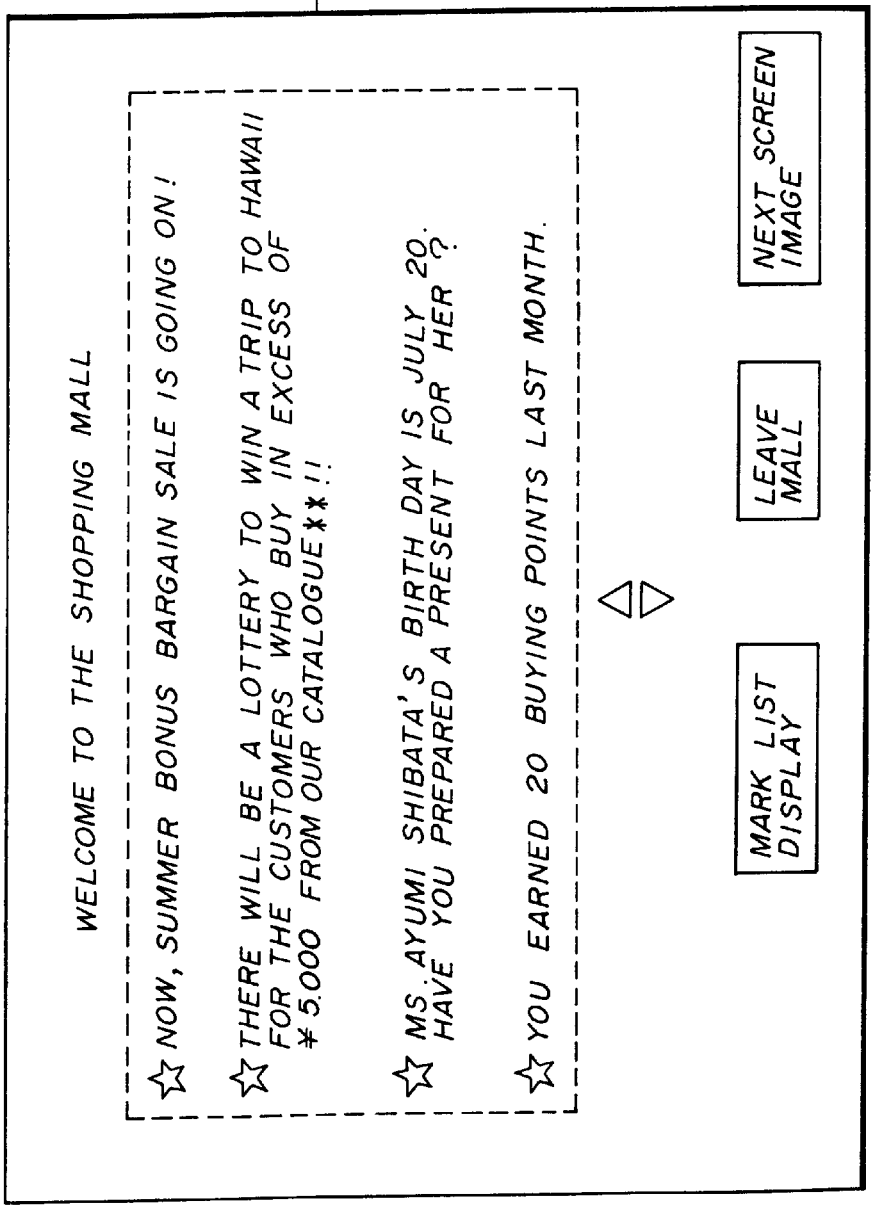
FIG. 21 shows an example of an initial screen image in response to a mall being accessed in the third embodiment.

Step S409) When the customer accesses (comes to) the mall, an initial screen image of the shopping mall shown in FIG. 21 is displayed for the customer. This displayed screen image is produced by the control unit 50 of the center 100 as a result of inserting into a message space thereof messages which are applicable during a predetermined period, a number of buying points earned, which points are given to the customer for buying goods, and so forth. Information such as the number of buying points earned by the customer is obtained as a result of a search of the customer coming-to-store history file 5 through the history management unit 30. After the messages and information are inserted into the message space after being appropriately edited, the information of the produced screen image such as that shown in FIG. 21 is transmitted to the terminal 200 which then displays it.

Figure 22A:
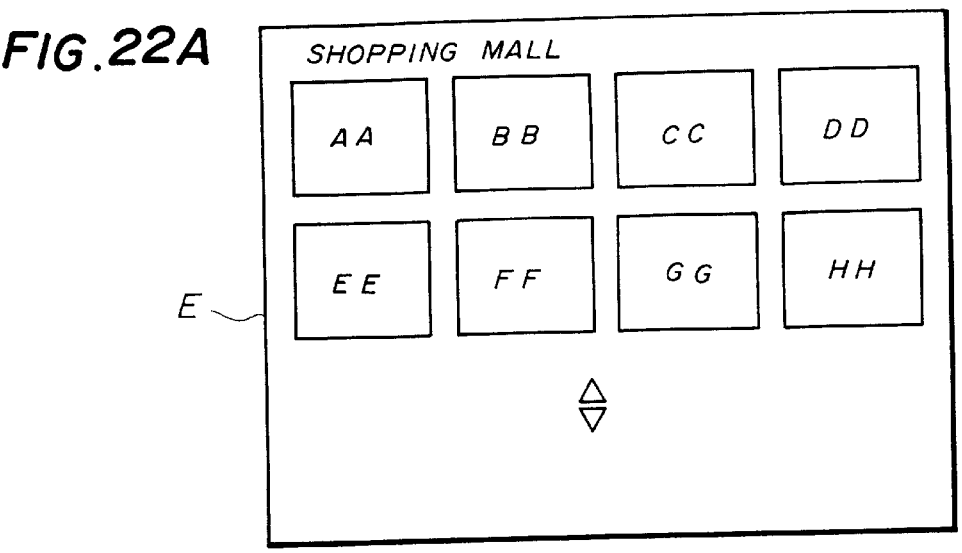
FIGS. 22A, 22B and 22C show an example of store initial screen images in the third embodiment.
Figure 22B:
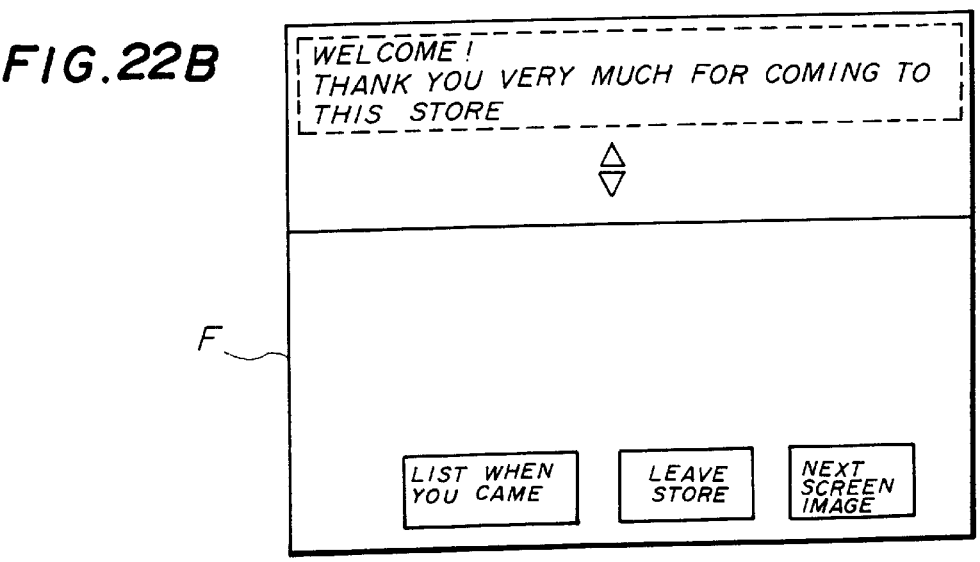
Figure 22C:
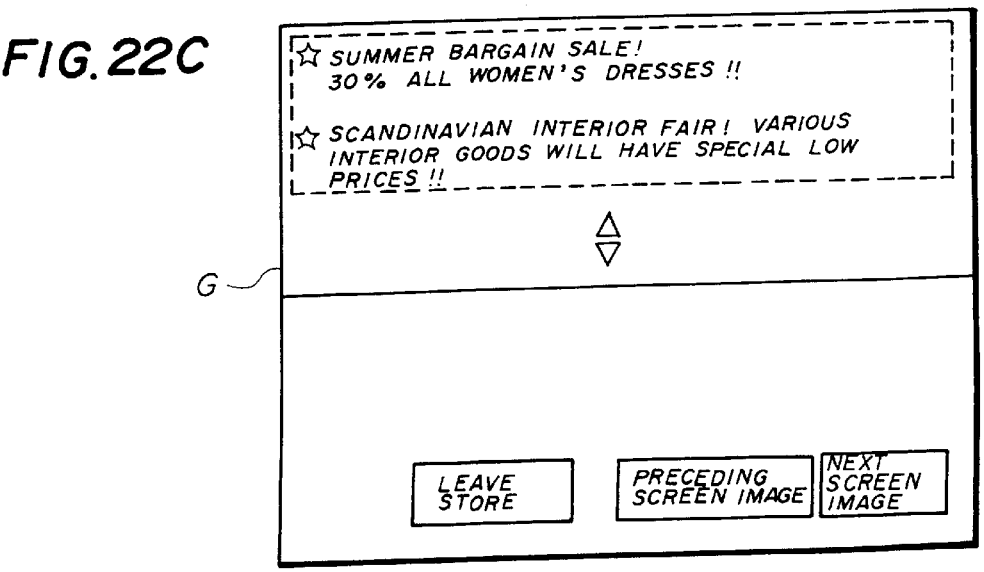
Figure 23:
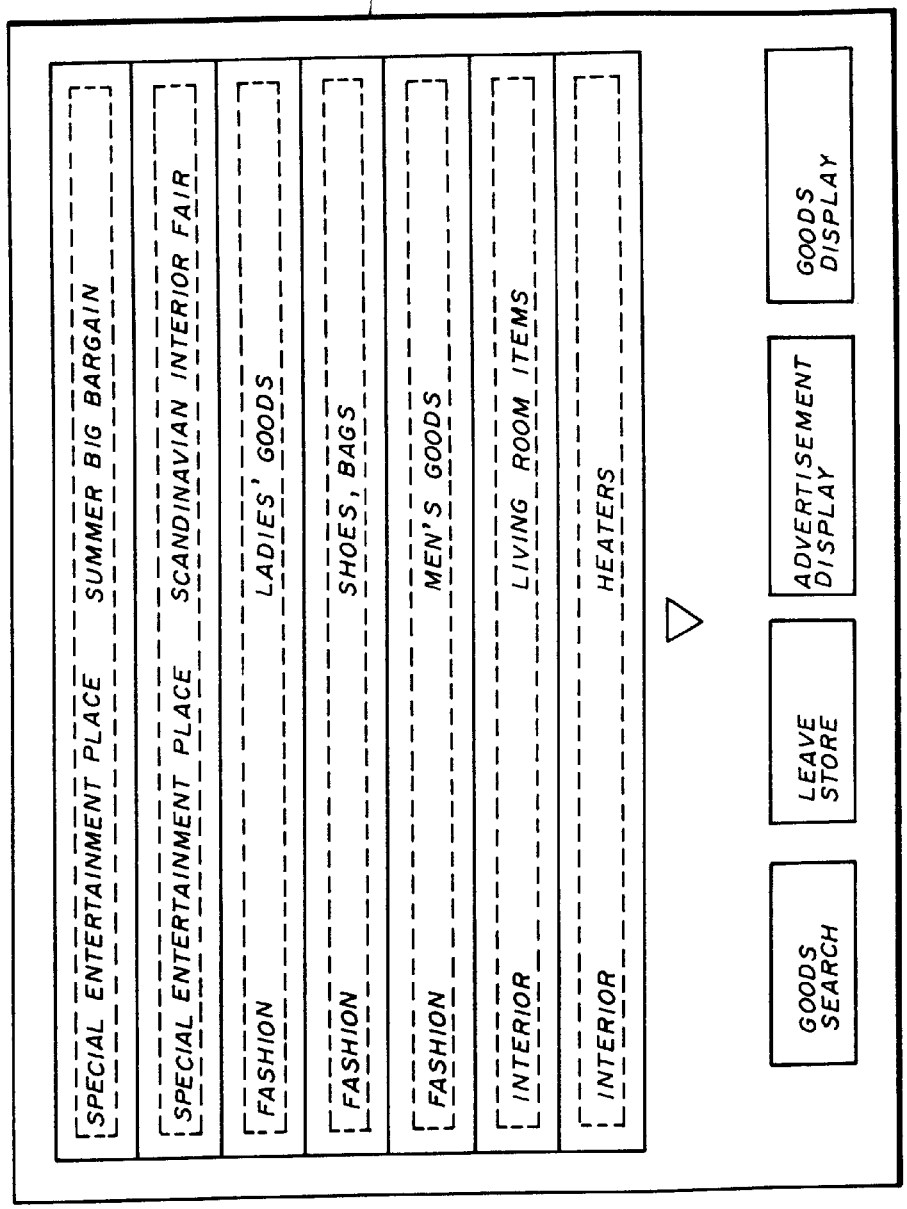
FIG. 23 shows an example of a screen image for floor introductions in the third embodiment.

Step S410) When a 'next screen image' box is clicked in the screen image shown in FIG. 21, a screen image E for selecting stores in the mall shown in FIG. 22A is displayed. Then, when the customer clicks an 'AA' box, a screen image F shown in FIG. 22B is displayed. When the customer clicks a 'next screen image' box in the screen image F, a screen image G shown in FIG. 22C is displayed. When the customer clicks a 'next screen image' box in the screen image G, a screen image H shown in FIG. 23 is displayed. Thus, when accessing (coming to) a store, screen image information in a hierarchical structure is provided for the customer from a screen image file (not shown in the figure). In the screen image H, floor introductions (group names of goods) are displayed assuming a condition where the store has many floors.

Step S411) When the customer clicks a 'goods search' box in the screen image H and also clicks a floor to be searched, the order reception unit 10 performs the order reception operation such as that described above in the first and second embodiments.

Step S412) When the order reception operation is finished and the customer clicks a 'leave store' box, the history management unit 30 collects the current time, a total cost of goods bought in the order reception operation, the goods information of the bought goods and so forth, and stores them in the customer coming-to-store history file 5.

By storing the customer's coming-to-store history as described above, it is possible to control the system so that, when a customer initially comes to the mall (initially accesses the shopping network), the mall or store summary is displayed for the customer. When, a customer who already has experience of coming to the mall comes to the mall, the mall or store summary is not displayed for the customer unless it is determined that the customer especially wishes to see it.

Further, for a customer who is already a member of the mall, the member-registration screen image is not displayed. Further, it is also possible to vary the contents of messages to be displayed depending on a coming-to-store time (access time). Thus, it is possible to provide messages appropriate for the current time and conditions.

Further, by incorporating order reception data into the customer coming-to-store history file 5, it is possible to display a special message only for customers who spent more than a predetermined sum of money or who bought in the mall more than a predetermined number of times.

Further, by searching the order reception file 3, a customer's tendency in buying goods can be determined and is used so that goods introductions appropriate for a particular customer's buying tendency may be provided. For example, by reading the order reception file 3, which materials a customer likes and selects and which color the customer likes and selects are read therefrom. This can be performed as a result of analyzing the article number which received orders and so forth, counting the number of times each article number received orders and sorting the article numbers in order of the number of times each article numbers received the orders. Therefrom, the buying tendency of the customer can be determined.

Fourth Embodiment

In a fourth embodiment of the present invention, the tendency of each customer is stored in the customer master file 6, and thereby it is possible to display a desired screen image without selecting from many screen images.

The order reception processing unit 10 takes statistics of the sizes of goods which each customer bought in the past, and the result of the statistics is stored in the customer master file 6. FIG. 24 shows an example of the customer master file 6 including the customers' statistics information. Thereby, the order reception processing unit 10 knows that a customer is already a member of the mall and knows the customer's size as tendency data from the customer's buying history. Therefore, without displaying a size selection window I on the selection screen image C as shown in FIG. 25 and then causing the customer to click the customer's size, it is possible to automatically determine the customer's size and indicate the size in a selection screen image such as the screen image C as shown in FIG. 7C.

It is also possible that, in the above-described third embodiment, the marked goods information in the second embodiment is used, and also, when the goods information is displayed for a customer, data indicating the customer's tendency in the fourth embodiment is also displayed. Specifically, when the customer accesses a store of the mall, the articles which, when coming to the store previously, the customer merely selected (put in a basket) but did not buy are displayed through the terminal 200 for the customer. At this time, the customer's size and information such as date/time the customer previously came to the store are also transmitted to the terminal 200. Thereby, without causing the size selection window to be displayed and without causing screen images to be displayed until the screen image of the goods information of the articles which the customer previously selected is reached, the goods information of those articles can be easily retrieved and the information of the appropriate articles can be easily retrieved.

In each of the above-described embodiments, it is assumed that the system comprises an online system in which the terminal 200 and the center 100 are electrically connected and communicate information to one another. However, application of the present invention is not limited to the online system. It is also possible to practice the present invention through a stand-alone computer. In this case, the terminal 200 and transmission/reception units 20 are removed from the system. Then, the order reception unit 10 and/or the control unit 50 (shown in FIG. 12) is practiced by a processor of the computer, manages the various data files, directly provides/displays various screens of image for a customer, and directly receives various specifications input by the customer.

The present invention is not limited to the above-described examples and embodiments, and variations and modifications may be made without departing from the claimed scope of the present invention.

What is claimed is:

1. A customer history management method, in online shopping, for managing customer information when a customer selects and buys a desired article from goods information provided to a customer terminal from a center which provides online shopping information including said goods information to said customer terminal, said method comprising the steps of:

a) individually storing as customer history information goods information for said customer, that is selected but not bought by said customer from goods information provided by said center, in a storage device; and b) selecting information to display depending on the customer history information when a goods information search request is subsequently made, including displaying the stored goods information, wherein the information read in step b) includes attributes of the goods.

2. The method according to claim 1, further comprising the steps of:

c) displaying goods information which has been provided by said center;

d) selecting desired articles from said goods information;

e) displaying a list of articles which were selected;

f) selecting, from said list of articles, articles to be bought; and g) storing information of articles which were brought and information of articles which were selected but were not bought, separately.

3. The method according to claim 2, further comprising the steps of:

h) storing either a list of articles selected in said step d) or a list of articles bought in said step f) in said storage means for each customer individually; and i) determining customer tendency from either said list of articles selected or said list of articles bought, and storing said tendency in said storage means for each customer individually.

4. The method according to claim 1, further comprising the steps of:

c) inputting an identifier of said customer;

d) displaying a list of articles that said customer of said identifier marked previously;

e) determining articles that said customer buys from said list of articles;

f) marking said articles that said customer buys in said step e), and storing information about said articles in said storage device for said customer individually, the stored information including attributes of the articles.

5. The method according to claim 4, further comprising the steps of:

g) storing a list of articles bought in said step e) in said storage device for each customer individually; and h) determining customer tendency from said list of articles bought, and storing said tendency in said storage device for each customer individually.

6. A customer history management method in online shopping, comprising the steps of:

storing as customer history information, for each store which sells goods, either history information of article selection or article buying, or history information of each access to said store for each customer individually, wherein the storing step stores information of articles which were selected but not purchased separately from information of articles which were bought; and displaying the customer history information, including the information of the articles which were selected but not purchased when the customer again accesses the store.

7. The method according to claim 6, further comprising the steps of:

a) storing a time said customer comes to said store and a time said customer leaves said store; and b) with reference to said stored times, appropriately changing information provided for said customer on a screen while said customer is shopping.

8. The method according to claim 6, further comprising the steps of:

a) storing a total sum of money said customer spent in said store or goods information of articles that said customer selects or buys in said store; and b) with reference to information stored in said step a), appropriately changing information being provided for said customer on a screen.

9. The method according to claim 6, further comprising the steps of:

a) deriving a tendency of said customer from said history information; and b) selecting screen image goods information being provided to said customer depending on said tendency.

10. The method according to claim 6, further comprising the step of providing store member registration screen image information to said customer only when said customer has not become a member of said store.

11. A customer history management method in online shopping, for managing customer information when a customer selects and buys a desired article from goods information provided to a customer terminal from a center which provides online shopping information including said goods information to said customer terminal, said method comprising the steps of:

a) storing, as customer history information, goods information which was selected but not bought by said customer from goods information provided by a store; and b) referring to said customer history information stored in said step a) when said customer subsequently requests a provision of goods information, and providing the customer history information, including said selected but not bought goods information to said customer, wherein the information provided in step b) includes attributes of the goods.

12. A customer history management system, in online shopping, for managing access history of a customer, said management system comprising:

a center to provide shopping information to the customer through an online system; and a terminal to input a selection of a desired article from said shopping information provided by said center, wherein said center further comprises:

article selection information storage device for storing as customer history information article selection information about articles that said customer selects;

article buying information storage device for storing as the customer history information article buying information about articles that said customer buys;

marked information storage device for storing information after marking said information, said information being a difference between all of said article selection information stored in said article selection information storage device and said article buying information stored in said article buying information storage device;

marked information providing means for selecting information to provide through said terminal depending on the customer history information when provision of said shopping information is requested upon a subsequent access to the center by the customer through said terminal, and providing the customer history information, including said marked information through said terminal, wherein the information provided by said marked information providing means includes attributes of the goods.

13. A customer history management system, in online shopping, for managing access history of a customer, said management system comprising:

a center to provide shopping information through an online system; and a terminal to input a selection of a desired article from said shopping information provided by said center, wherein said center further comprises:

article selection information storage device for storing as customer history information article selection information about articles that said customer selects;

article selection information providing means for providing the customer history information, including said article selection information, through said terminal;

bought-article-removed information storage device for storing as the customer history information article selection information which remains after removing article selection information of articles which said customer has bought, from said article selection information provided by said article selection information providing means;

marked information storage device for storing information obtained as a result of marking information stored in said bought-article-removed information storage device; and marked information providing means for, when provision of said shopping information is requested upon a subsequent access to the center by the customer through said terminal, selecting information to provide through said terminal depending on the customer history information and providing the customer history information, including said marked information through said terminal.

14. A customer history management system, in online shopping, for managing access history of a customer, said management system comprising:

a center to provide shopping information through an online system; and a terminal to input a selection of a desired article from said shopping information provided by said center, wherein said center further comprises:

history information storage device for storing history information of a store that said customer accesses in online shopping, and storing article selection history information separately from article buying history information; and screen image information selection means for selecting screen image information provided through said terminal depending on said history information stored in said history information storage device.

15. The system according to claim 14, wherein said history information storage device further comprises tendency information storage device for storing information indicating a tendency of said article selection history information or said article buying history information.

16. The system according to claim 14, wherein said center further comprises registration screen image information providing means for providing member registration screen image information for said customer only when said customer has not been registered in said store in said online shopping.

17. A customer history management system, in online shopping, for managing customer information when a customer selects and buys a desired article from goods information provided to a customer terminal from a center which provides online shopping information including said goods information to said customer terminal, said system comprising:

a storage device for storing, as customer history information, goods information which was selected but not bought by said customer from goods information provided by a store; and goods information providing means for referring to said customer history information stored in said storage device, when said customer subsequently requests provision of goods information, and providing said goods information to said customer, wherein the information provided by said goods information providing means includes attributes of the goods.

18. A computer-implemented customer history management method, comprising the steps of:

a) storing a customer's shopping history information, including information of goods selected but not ordered, when said customer accesses a store; and b) referring to said shopping history information stored in said step a), when said customer subsequently accesses said store, and providing customer shopping information which is selected based on said shopping history information, which includes the information of the goods selected but not ordered in a previous access to the store by the customer, wherein the information provided in step b) includes attributes of the goods.

19. A customer history management system, comprising:

a storage device for storing customer history information, including information of goods selected but not ordered, corresponding to a customer when said customer accesses a store; and shopping information providing means for referring to said customer history information stored in said storage device, when said customer subsequently accesses said store, and providing customer shopping information which is selected based on said customer history information, which includes the information of the goods selected but not ordered in a previous access to the store by the customer, wherein the information provided by said shopping information providing means includes attributes of the goods.

20. A computer program product, comprising:

a computer usable medium having computer readable program code means embodied in said medium, said computer readable program code means comprising:

first program code means for storing customer history information, including information of goods selected but not ordered, corresponding to a customer when said customer accesses a store; and second program code means for referring to said customer history information stored by said first program code means, when said customer subsequently accesses said store, and providing for said customer shopping information which is selected based on said customer history information, which includes the information of the goods selected but not ordered in a previous access to the store by the customer, wherein the information provided by said second program code means includes attributes of the goods.

21. An online shopping customer history management method, comprising the steps of:

storing as customer history information either history information of article selection or article buying, or history information of a customer access to a store;

storing a time the customer comes to the store and a time the customer leaves the store; and changing information provided for said customer on a screen with reference to the stored times and the stored customer history information while said customer is shopping.

22. An online shopping customer history management system, comprising:

a storage device for storing as customer history information goods information selected but not bought by a customer from goods information provided by a store as previously selected goods information; and goods information providing means for selecting information to provide to the customer depending on the customer history information, including providing the previously selected goods information, in addition to subsequently requested goods information, when the customer subsequently requests goods information, wherein the information provided by said goods information providing means includes attributes of the goods.

23. A customer history management method in online shopping, for managing customer information when a customer selects or buys a desired article from goods information provided to a customer terminal from a online shopping center, comprising:

storing as customer history information goods information which were selected but not ordered by the customer from goods information provided by the online shopping center;

storing as the customer history information goods information which were purchased by the customer from goods information provided by the online shopping center, wherein the purchased goods information is stored separately from the selected goods information; and presenting information to the customer depending on the customer history information, including presenting the stored selected but not ordered goods information to the customer, when the customer subsequently requests a provision of goods information, wherein the presented goods information includes attributes of the goods, and the attributes comprise information in addition to the names of the goods.

24. A customer history management method, comprising:

storing a list of articles selected but not bought by a customer in an online shopping center;

determining customer tendencies from the stored list of articles selected but not bought, storing the tendencies in a storage device for each customer individually; and preparing a selection of articles for presenting to the customer, based on the stored tendencies from the stored list of articles selected but not bought, before the customer actually inputs a selection in the online shopping center.

25. A computer-implemented customer history management method, comprising:

a) storing the time a customer comes to a store and the time the customer leaves the store;

b) storing information of articles selected but not bought by the customer during the times the customer is at the store, based on the times stored in step a); and c) providing, when the customer subsequently accesses the store, information to the customer that an article stored in step b) that was out of stock during the time stored in step a) is now in stock. subsequently requests goods information, wherein the information provided by said goods information providing means includes attributes of the goods.

26. A computer-implemented customer history management method, comprising:

storing a customer's shopping history information, including information of articles selected but not ordered, when said customer accesses a store; and referring to said stored shopping history information, when said customer subsequently accesses said store, and providing to the customer introductions to articles, the introductions being selected based on said shopping history information, which includes the information of the articles selected but not ordered in a previous access to the store by the customer.

27. A customer history management system, comprising:

a storage device storing customer history information, including information of articles selected but not ordered, corresponding to a customer when the customer accesses a store; and shopping information providing unit in communication with the storage device and referring to said stored customer history information, when the customer subsequently accesses the store, and providing to the customer introductions to articles based on the stored customer history information, which includes the information of the articles selected but not ordered in a previous access to the store by the customer.

* * * * *